(12) United States Patent
Yamadera et al.

(10) Patent No.: US 12,480,552 B2
(45) Date of Patent: Nov. 25, 2025

(54) NON-EXCITED OPERATION TYPE BRAKE FOR BRAKE DEVICE AND DISC BRAKE DEVICE

(71) Applicant: AKEBONO BRAKE INDUSTRY CO., LTD., Tokyo (JP)

(72) Inventors: Shinichi Yamadera, Tokyo (JP); Quyen Huu Nguyen, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 407 days.

(21) Appl. No.: 18/118,304

(22) Filed: Mar. 7, 2023

(65) Prior Publication Data

US 2023/0287948 A1    Sep. 14, 2023

(30) Foreign Application Priority Data

Mar. 9, 2022    (JP) .................................. 2022-035879

(51) Int. Cl.

| | | |
|---|---|---|
| *F16D 59/02* | (2006.01) | |
| *F16D 55/226* | (2006.01) | |
| *F16D 55/36* | (2006.01) | |
| *F16D 65/18* | (2006.01) | |
| *H02K 7/102* | (2006.01) | |
| *B60T 1/06* | (2006.01) | |
| *B60T 13/74* | (2006.01) | |
| *F16D 121/22* | (2012.01) | |

(Continued)

(52) U.S. Cl.
CPC ........... *F16D 65/18* (2013.01); *F16D 55/226* (2013.01); *F16D 55/36* (2013.01); *H02K 7/102* (2013.01); *B60T 1/065* (2013.01); *B60T 13/746* (2013.01); *F16D 2121/22* (2013.01); *F16D 2121/24* (2013.01); *F16D 2125/40* (2013.01); *F16D 2125/48* (2013.01)

(58) Field of Classification Search
CPC .. F16D 59/02; F16D 2121/22; F16D 2129/08; F16D 2127/06; F16D 2121/20; H02K 7/1023; H02K 7/1028
See application file for complete search history.

(56) References Cited

U.S. PATENT DOCUMENTS

| | | | | |
|---|---|---|---|---|
| 3,381,784 A | * | 5/1968 | Miller | ..................... B41L 39/00 |
| | | | | 192/66.32 |
| 3,672,042 A | * | 6/1972 | Jaeschke | ............. H01F 41/0206 |
| | | | | 188/164 |

(Continued)

FOREIGN PATENT DOCUMENTS

| | | |
|---|---|---|
| JP | 2016-050629 A | 4/2016 |
| JP | 2018-184093 A | 11/2018 |

*Primary Examiner* — Nicholas J Lane
(74) *Attorney, Agent, or Firm* — Faegre Drinker Biddle & Reath LLP

(57) ABSTRACT

There is provided a non-excited operation type brake for a brake device that is configured to allow rotation of a motor shaft when energized and that is configured to stop the rotation of the motor shaft when de-energized, including: a casing that is configured to function as a yoke and that includes a coil accommodating portion having a substantially U-shaped cross section and formed in an annular shape as a whole. The casing further includes an auxiliary yoke that has a substantially cylindrical shape and that is fitted inside the coil accommodating portion, the auxiliary yoke being separated from the coil accommodating portion.

8 Claims, 21 Drawing Sheets

(51) Int. Cl.
*F16D 121/24* (2012.01)
*F16D 125/40* (2012.01)
*F16D 125/48* (2012.01)

(56) References Cited

U.S. PATENT DOCUMENTS

| | | | | |
|---|---|---|---|---|
| 4,090,161 | A * | 5/1978 | Fuhrer | F16D 65/0031 188/164 |
| 4,386,684 | A * | 6/1983 | Prokop | F16D 51/00 188/138 |
| 5,490,583 | A * | 2/1996 | Anderson | F16D 59/00 188/164 |
| 6,471,017 | B1 * | 10/2002 | Booz | F16D 55/02 188/162 |
| 2009/0284105 | A1 * | 11/2009 | Miyashita | H02K 5/1732 310/68 B |
| 2012/0073916 | A1 * | 3/2012 | Chen | F16D 65/186 188/171 |
| 2013/0192934 | A1 * | 8/2013 | Knop | F16D 55/28 188/72.3 |
| 2018/0001878 | A1 * | 1/2018 | Thomas | H02K 7/14 |
| 2018/0045255 | A1 * | 2/2018 | Chelaidite | F16D 65/16 |

* cited by examiner

NON-EXCITED OPERATION TYPE BRAKE FOR BRAKE DEVICE AND DISC BRAKE DEVICE

CROSS-REFERENCE TO RELATED APPLICATIONS

This application is based on Japanese Patent Application No. 2022-035879 filed on Mar. 9, 2022, the contents of which are incorporated herein by way of reference.

TECHNICAL FIELD

The present invention relates to a non-excited operation type brake for brake device and disc brake device.

BACKGROUND

Disc brake devices are used not only for front wheels of automobiles, but also for rear wheels in an increasing number of cases because of their excellent heat dissipation and an ability to finely adjust a braking force during running.

The disc brake devices are roughly divided into hydraulic disc brake devices that use hydraulic oil to obtain the braking force, and electric disc brake devices that use an electrically drivable actuator to obtain the braking force.

As disclosed in JP2018-184093A and the like, as the electric disc brake devices, there is an electric parking brake type configuration in which a braking force of a service brake is generated by feeding brake oil (fluid) into a cylinder, and a braking force of a parking brake is generated by driving an electric actuator such as a rotary-to-linear motion conversion mechanism by an electric motor.

In the disc brake devices having the electric parking brake type configuration, it is necessary to maintain the braking force of the parking brake even when an engine of the automobile is stopped and the electric motor is de-energized.

Therefore, as disclosed in JP2016-50629A and the like, it is considered to provide a worm reduction mechanism having a self-locking function between the electric motor and a piston that presses a pad. With such a configuration, even when the engine of the automobile is stopped and the electric motor is de-energized, the pad can be kept pressed against the rotor, and the braking force of the parking brake can be maintained.
Patent Literature 1: JP2018-184093A
Patent Literature 2: JP2016-50629A The worm reduction mechanism with the self-locking function tends to have greater frictional resistance (energy loss) and lower input and output characteristics (efficiency) than a worm reduction mechanism without the self-locking function.

In view of such circumstances, the present inventors consider using a non-excited operation type brake instead of the worm reduction mechanism with the self-locking function to maintain the braking force of the parking brake while the engine of the automobile is stopped and the electric motor is de-energized.

The undisclosed non-excited operation type brake that the present inventors considered before completing the present invention includes an electromagnetic coil, a yoke that is a press-formed product that accommodates the electromagnetic coil, an armature, a fixed plate that is fixed to the yoke, a rotation disc that is disposed between the fixed plate and the armature and that is engaged with a motor shaft of an electric motor in a way of being displaceable in an axial direction but not relatively displaceable in a circumferential direction, and a pressing spring that biases the armature toward the fixed plate.

The non-excited operation type brake forms a magnetic circuit between the yoke and the armature when the electromagnetic coil is energized. In this way, the armature is moved (magnetically attracted) toward the electromagnetic coil against an elastic force of the pressing spring. As a result, the rotation disc is not pressed against the fixed plate by the armature, so that the motor shaft is allowed to rotate. In this manner, the non-excited operation type brake allows the motor shaft to rotate while the engine of the automobile is running and the electromagnetic coil is energized.

On the other hand, when the electromagnetic coil is de-energized, the magnetic circuit is not formed between the yoke and the armature unlike when the electromagnetic coil is energized. For this reason, the rotation disc is pressed against the fixed plate by the armature and frictionally engages with the fixed plate. As a result, the rotation of the motor shaft is stopped. In this way, the non-excited operation type brake can maintain the braking force of the parking brake while the engine of the automobile is stopped and the electromagnetic coil is de-energized.

However, in the non-excited operation type brake according to the previous inventions, there is room for improvement in that when the electromagnetic coil is energized, magnetic flux leakage is likely to occur, and the force (magnetic attraction force) that moves the armature toward the electromagnetic coil tends to be insufficient.

The present invention is made to solve the above problems, and an object thereof is to provide a non-excited operation type brake for a brake device that can suppress the occurrence of magnetic flux leakage and sufficiently ensure the magnetic attraction force that moves the armature toward the electromagnetic coil.

The present inventors conduct intensive research into a reason why the magnetic flux leakage occurs, and find that the reason lies in a thickness of the yoke. That is, although the yoke is desirably manufactured by press working for reasons such as cost reduction, when the yoke is manufactured by press working, generally, the thickness of the yoke is substantially constant. Moreover, the yoke has a substantially U-shaped cross-sectional shape so as to cover a periphery of the electromagnetic coil, and is configured in an annular shape as a whole. Therefore, when the yoke is manufactured by press working, in the yoke, a thickness of an inner peripheral side wall portion disposed on an inner side in a radial direction of the electromagnetic coil is the same as a thickness of an outer peripheral side wall portion disposed on an outer side in the radial direction of the electromagnetic coil. However, based on a matter that a diameter of the inner peripheral side wall portion is smaller than a diameter of the outer peripheral side wall portion, in a virtual plane orthogonal to a central axis, a cross-sectional area of the inner peripheral side wall portion is smaller than a cross-sectional area of the outer peripheral side wall portion, and therefore, an amount of magnetic flux that can pass through inside of the inner peripheral side wall portion is smaller than an amount of magnetic flux that can pass through inside of the outer peripheral side wall portion. As a result, it is found that when the thickness of the yoke is constant, the amount of magnetic flux that can pass through the inside of the inner peripheral side wall portion is reduced, and the magnetic flux leakage is likely to occur.

The present invention is completed as a result of intensive research based on such a finding.

SUMMARY

A non-excited operation type brake for a brake device according to one aspect of the present invention is configured to allow rotation of a motor shaft when energized and is configured to stop the rotation of the motor shaft when de-energized, and includes a casing, a fixed plate, an electromagnetic coil, an armature, a rotation disc, and a pressing spring.

The casing is configured to function as a yoke, and includes a coil accommodating portion that having a substantially U-shaped cross section and formed in an annular shape as a whole.

The fixed plate is fixed to the casing while being separated from the casing in an axial direction of the motor shaft.

The electromagnetic coil is accommodated in the coil accommodating portion.

The armature is disposed between the fixed plate and the electromagnetic coil.

The rotation disc is disposed coaxially with the motor shaft between the fixed plate and the armature.

The pressing spring is configured to bias the armature in a direction away from the electromagnetic coil in the axial direction of the motor shaft.

The rotation disc is engaged with the motor shaft or a shaft that is configured to rotate in synchronism with the motor shaft in a way of being displaceable relative to the axial direction of the motor shaft and not displaceable relative to a circumferential direction of the motor shaft.

In the non-excited operation type brake for a brake device according to one aspect of the present invention, the casing further includes an auxiliary yoke that has a substantially cylindrical shape and that is fitted inside the coil accommodating portion, the auxiliary yoke being separated from the coil accommodating portion.

In the non-excited operation type brake for the brake device according to one aspect of the present invention, the coil accommodating portion includes an inner peripheral side wall portion disposed on an inner side in a radial direction of the electromagnetic coil, an outer peripheral side wall portion disposed on an outer side in the radial direction of the electromagnetic coil, and a bottom wall portion connecting an end portion of the inner peripheral side wall portion and an end portion of the outer peripheral side wall portion in a radial direction of the motor shaft. The inner peripheral side wall portion, the outer peripheral side wall portion, and the bottom wall portion can have the same thickness.

In the non-excited operation type brake for the brake device according to one aspect of the present invention, the casing may include a casing body including the coil accommodating portion and the auxiliary yoke.

The coil accommodating portion includes a substantially L-shaped cut-and-raised piece on the bottom wall portion. The auxiliary yoke includes an outward engaging piece extending toward the outer side in the radial direction at an end portion on a side opposite to the armature in the axial direction of the motor shaft. The auxiliary yoke can be configured to be suppressed from coming off from the casing body by engagement between the cut-and-raised piece and the outward engaging piece.

In the non-excited operation type brake for the brake device according to one aspect of the present invention, the pressing spring may be a coil spring and may be disposed on an inner side in a radial direction of the auxiliary yoke.

In this case, the auxiliary yoke includes an inward engaging piece extending toward the inner side in the radial direction at an end portion on a side opposite to the armature in the axial direction of the motor shaft. The pressing spring can be disposed between the armature and the inward engaging piece in the axial direction of the motor shaft.

The non-excited operation type brake for the brake device according to one aspect of the present invention may further include a stationary disc supported by the casing in a way of being displaceable relative to the axial direction of the motor shaft and not displaceable relative to the circumferential direction of the motor shaft. A plurality of the rotation discs may be provided, and the stationary disc may be disposed between the rotation discs adjacent to each other in the axial direction of the motor shaft.

A disc brake device according to one aspect of the present invention includes a caliper including a cylinder on an inner side of a rotor in an axial direction of the rotor, a piston fitted in the cylinder, a rotary-to-linear motion conversion mechanism that is disposed in the cylinder and that is configured to convert rotary motion into linear motion so as to push the piston toward the rotor, and a motor gear unit that is supported by and fixed to the caliper and that is configured to drive the rotary-to-linear motion conversion mechanism.

The motor gear unit includes an electric motor including a motor shaft, and a non-excited operation type brake that is configured to allow rotation of the motor shaft when energized and that is configured to stop the rotation of the motor shaft when de-energized.

In the disc brake device according to one aspect of the present invention, the non-excited operation type brake for a brake device according to one aspect of the present invention is used as the non-excited operation type brake.

DESCRIPTION OF EMBODIMENTS

First Embodiment

Figure 1:
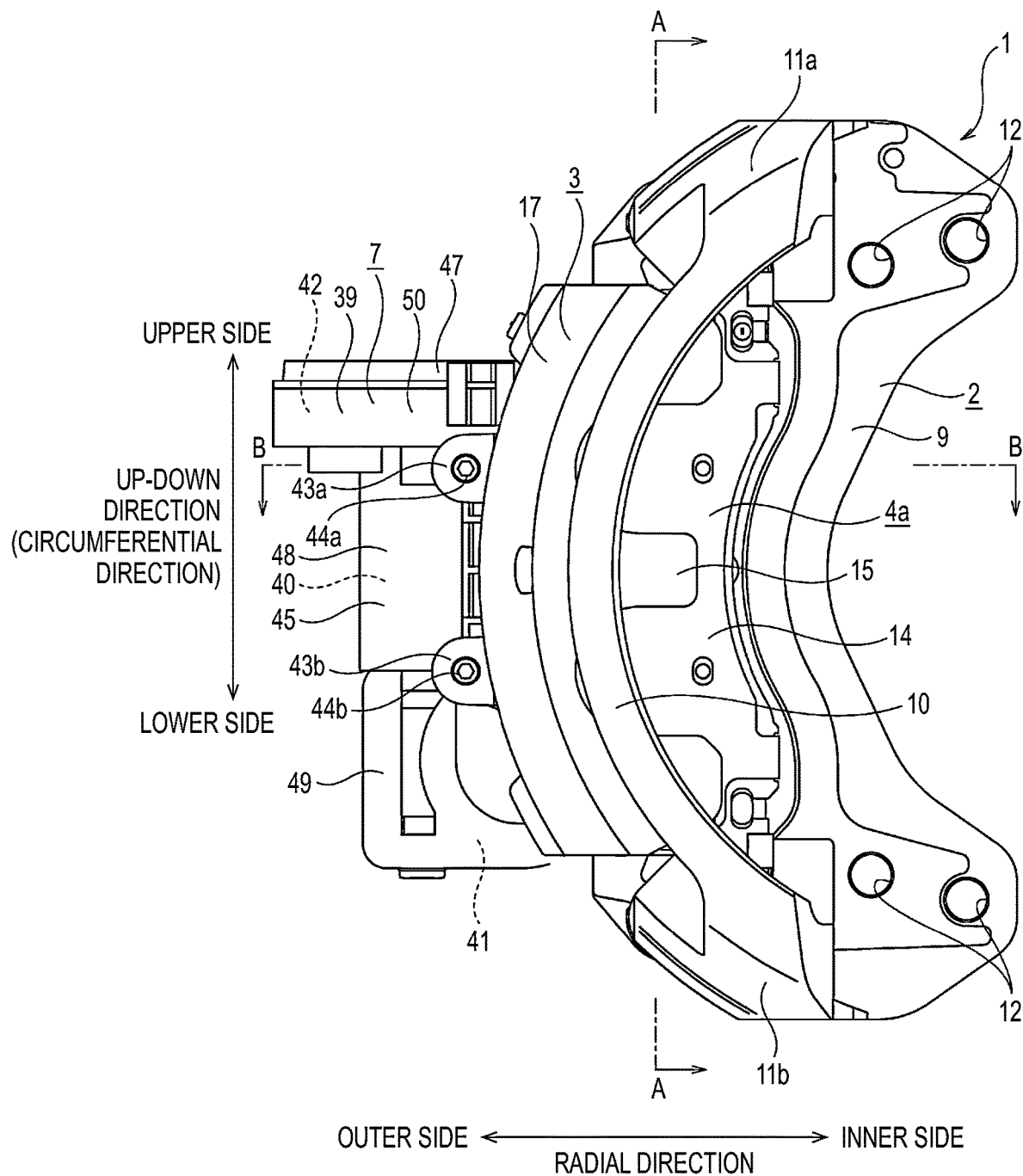
FIG. 1 is a front view of a disc brake device according to a first embodiment in a state of being mounted to a suspension device as viewed from outside of a vehicle body.

A first embodiment will be described with reference to FIGS. 1 to 21.
[Overall Configuration of Disc Brake Device]

The disc brake device 1 according to the present embodiment is an electric parking brake type disc brake device, and has both a function as a hydraulic service brake and a function as an electric parking brake.

The disc brake device 1 is a floating type disc brake device and includes a support 2, a caliper 3, a pair of pads 4a and 4b (an outer pad 4a and an inner pad 4b), two pistons 5a and 5b (a first piston 5a and a second piston 5b), two rotary-to-linear motion conversion mechanisms 6a and 6b (a first rotary-to-linear motion conversion mechanism 6a and a second rotary-to-linear motion conversion mechanism 6b), and a motor gear unit 7 including an electric motor 40 and a non-excited operation type brake 42.

The present embodiment shows a case where the present invention is applied to a disc brake device incorporated in a relatively large vehicle. For this reason, although the disc brake device 1 includes two pistons 5a and 5b and two rotary-to-linear motion conversion mechanisms 6a and 6b, when the present invention is applied to a disc brake device for a general passenger car, the disc brake device may include one piston and one rotary-to-linear motion conversion mechanism. Three or more pistons and three or more rotary-to-linear motion conversion mechanisms may be provided.

The disc brake device 1 obtains a braking force of a service brake by feeding brake oil (pressure oil), which is hydraulic oil, to a first cylinder 20a and a second cylinder 20b provided in the caliper 3. On the other hand, the disc brake device 1 obtains a braking force of a parking brake by using the motor gear unit 7 to drive the first rotary-to-linear motion conversion mechanism 6a and the second rotary-to-linear motion conversion mechanism 6b without using the hydraulic oil.

In the following description related to the disc brake device 1, unless otherwise specified, an axial direction, a circumferential direction, and a radial direction refer to an axial direction, a circumferential direction, and a radial direction of a disc-shaped rotor 8 (see FIG. 7) that rotates together with wheels. A front-back direction in FIGS. 1, 2, 8, 9, and 10, an up-down direction in FIGS. 3 and 7, and a left-right direction in FIG. 6 all correspond to the axial direction. When the disc brake device 1 is mounted to a vehicle body, a central side of the vehicle body is referred to as an inner side in the axial direction, and outside of the vehicle body is referred to as an outer side in the axial direction. An up-down direction in FIGS. 1, 2, 6, 8, 9, 10, and 11 and a front-back direction in FIGS. 3 and 7 both correspond to the circumferential direction, and correspond to an up-down direction when the disc brake device 1 is mounted to the vehicle body. A left-right direction in FIGS. 1 to 3 and 7 to 11, and a front-back direction in FIG. 6 both correspond to the radial direction. A left side in FIGS. 1, 3, 7, and 8, and a right side in FIGS. 2, 9, and 10 both correspond to an outer side in the radial direction, and a right side in FIGS. 1, 3, 7 and 8, and a left side in FIGS. 2, 9, and 10 both correspond to an inner side in the radial direction.
<Support>

The support 2 is a cast product of an iron-based alloy such as cast iron, and includes a support base 9 disposed on the inner side in the axial direction of the rotor 8, an outer joint disposed on the outer side in the axial direction of the rotor 8, and a pair of connecting arms 11a and 11b that connect both outer end portions in the circumferential direction of the support base 9 to both outer end portions in the circumferential direction of the outer joint 10, respectively, in the axial direction. A guide hole (not shown) opening toward the inner side in the axial direction is formed in a portion that is on the outer side in the radial direction (rotor path portion) of each of the connecting arms 11a and 11b. The support 2 is fixed to a suspension device constituting the vehicle body by using a plurality of (four in the illustrated example) mounting holes 12 formed in a portion that is on the inner side in the radial direction of the support base 9.

Figure 2:
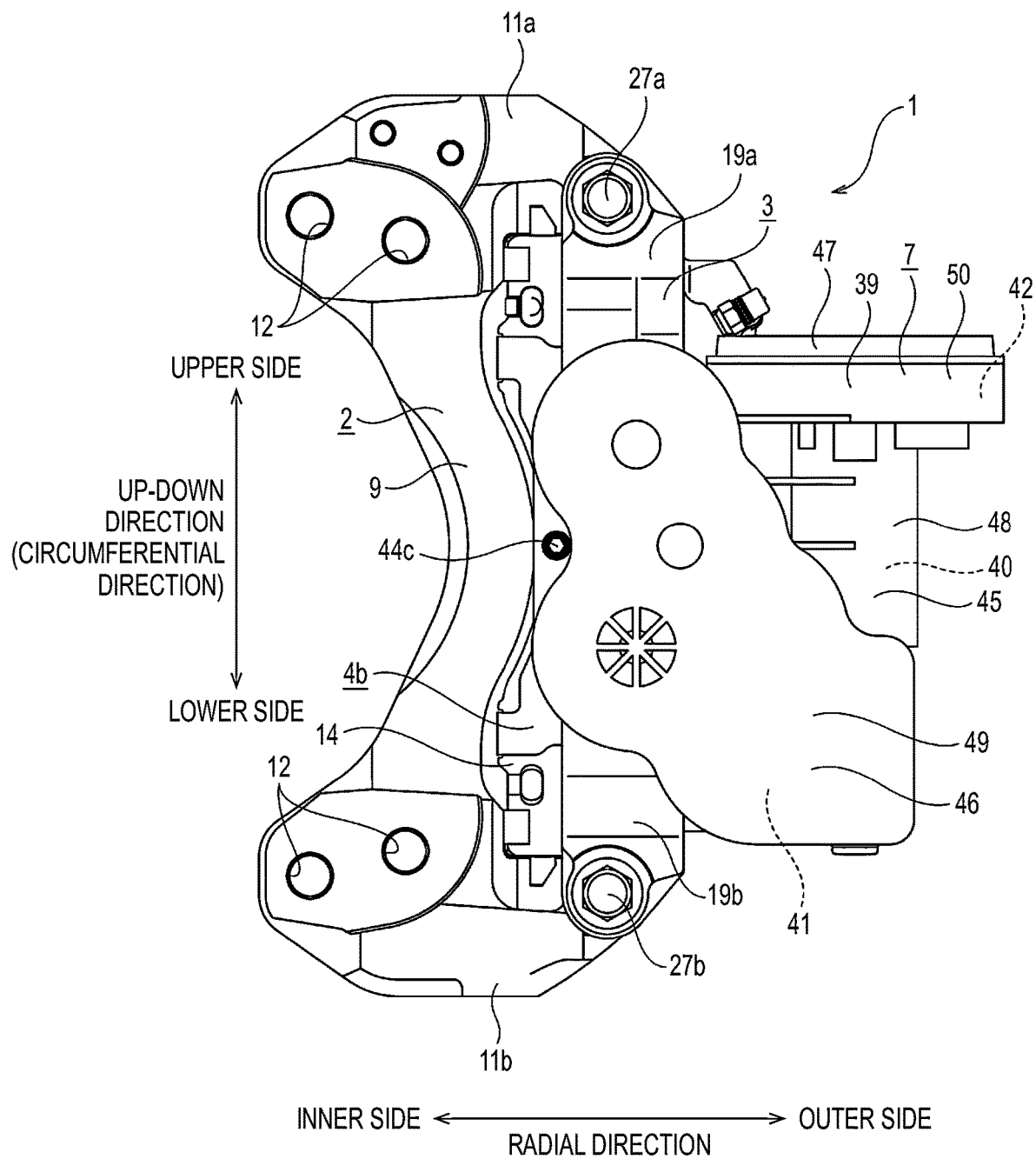
FIG. 2 is a rear view of the disc brake device according to the first embodiment in a state of being mounted to the suspension device as viewed from a central side of the vehicle body.
Figure 3:
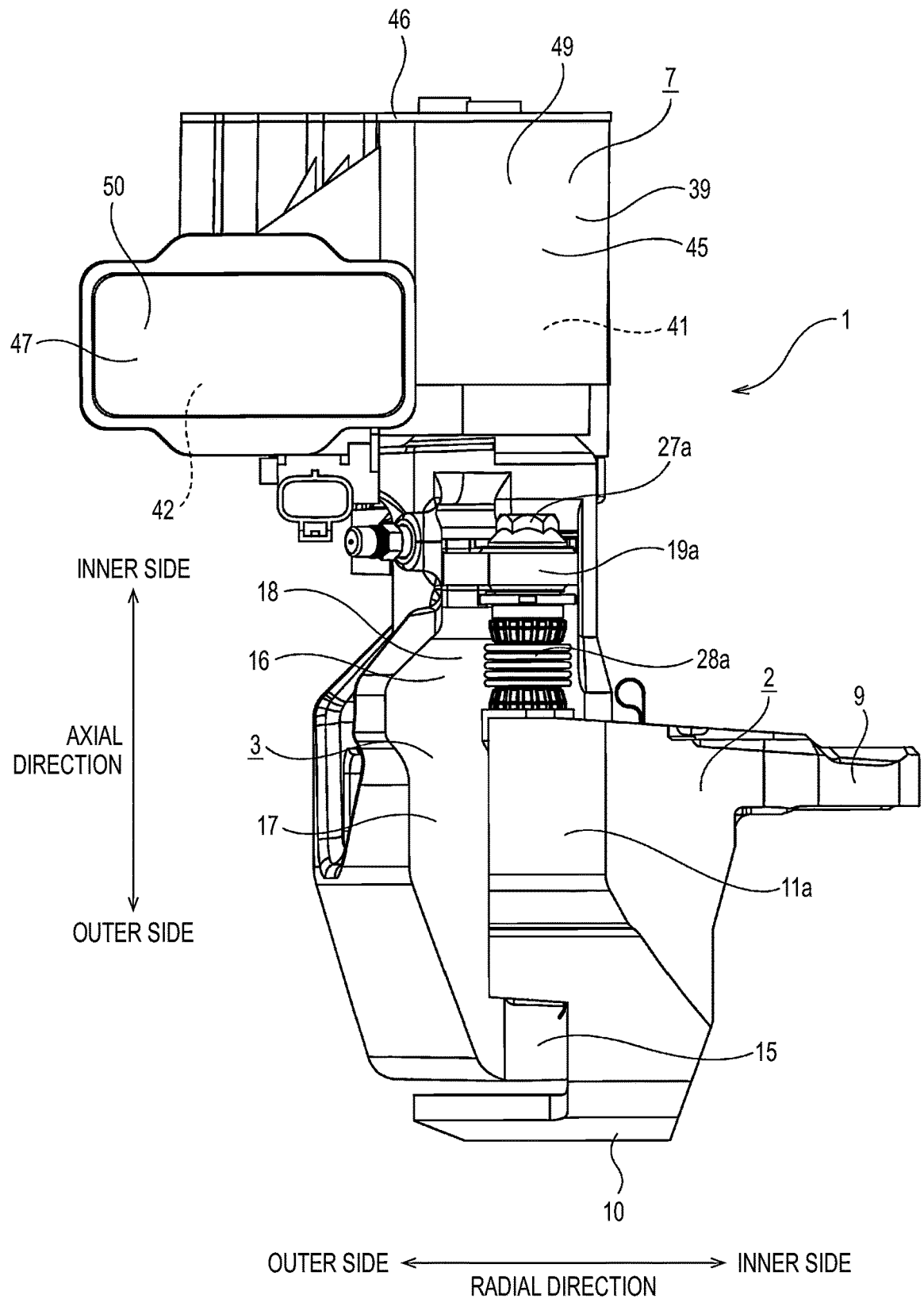
FIG. 3 is a plan view of the disc brake device according to the first embodiment as viewed from an upper side of FIG. 1.
Figure 4:
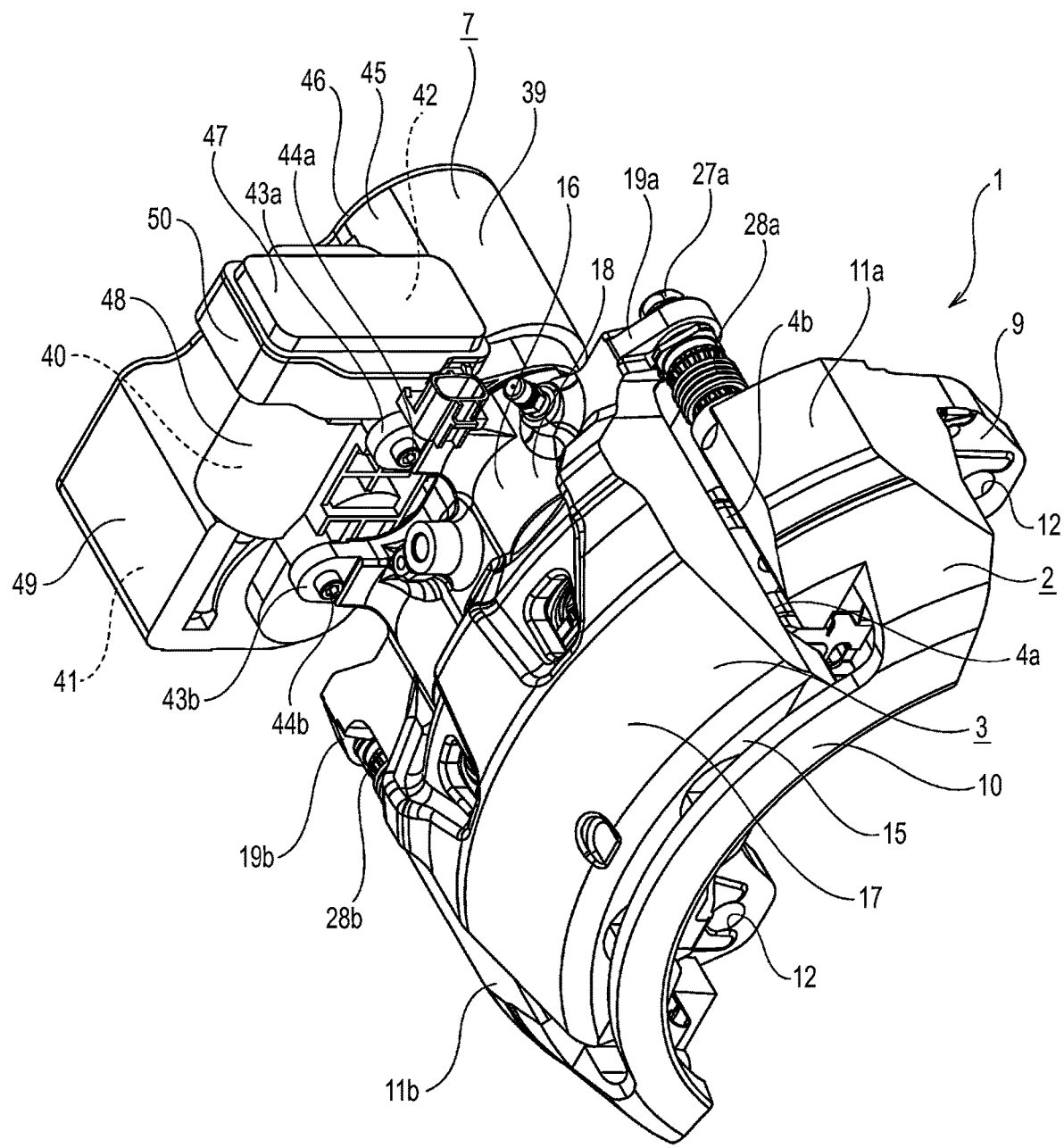
FIG. 4 is a perspective view of the disc brake device according to the first embodiment as viewed from the outside of the vehicle body and an outer side in a radial direction.
Figure 5:
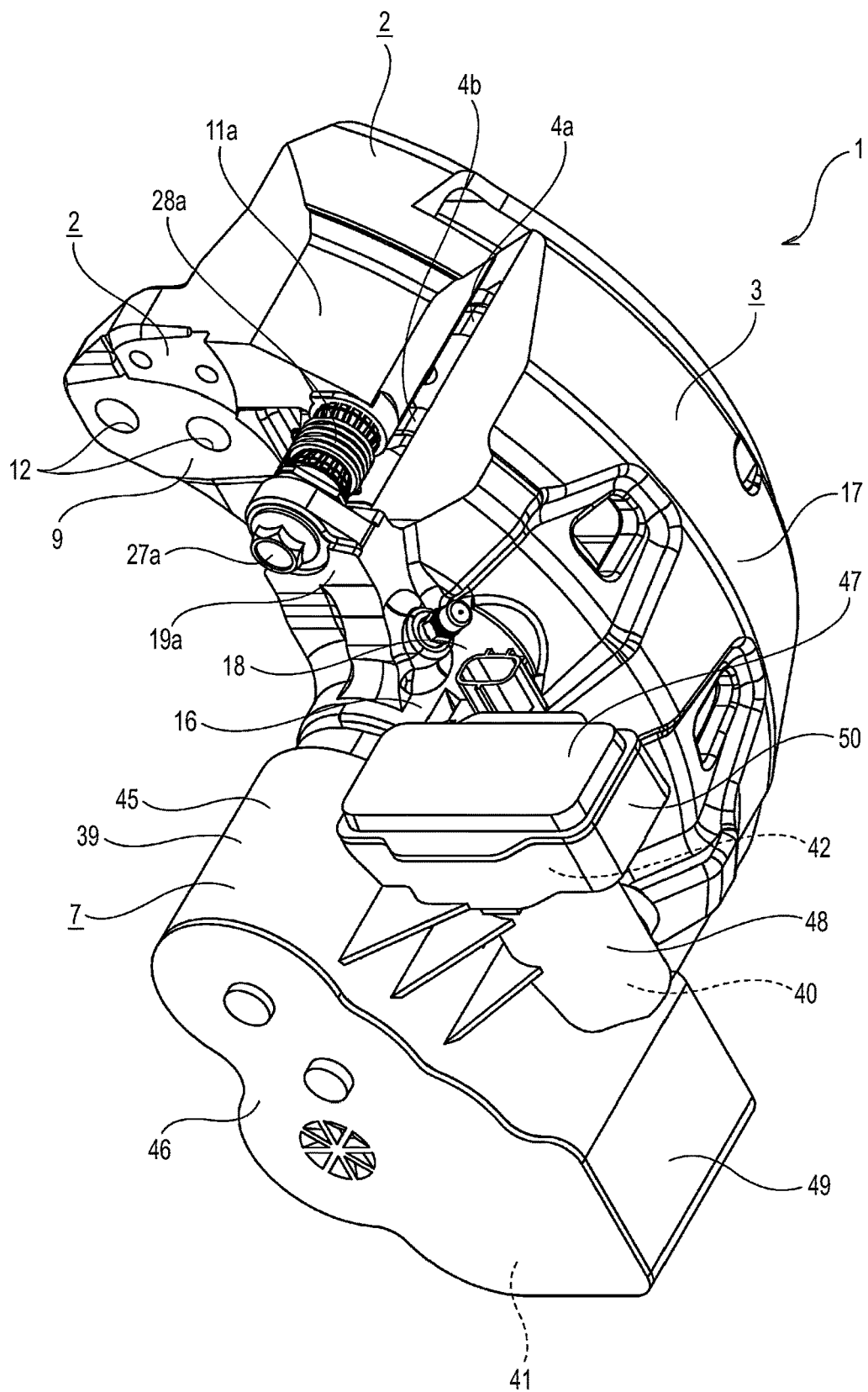
FIG. 5 is a perspective view of the disc brake device according to the first embodiment as viewed from the central side of the vehicle body and the outer side in the radial direction.

In the disc brake device 1 according to the present embodiment, with the support 2 fixed to the suspension device, as shown in FIGS. 1 and 2, one connecting arm 11a is disposed on an upper side in the up-down direction, and the other connecting arm 11b is disposed on a lower side in the up-down direction. However, during implementation of the present invention, an assembly direction of the disc brake device is not specified.
<Outer Pad and Inner Pad>

The outer pad 4a and the inner pad 4b are disposed on both sides of the rotor 8 in the axial direction, respectively. Specifically, the outer pad 4a is disposed on the outer side in the axial direction of the rotor 8 and is supported by the support 2 in a way of being displaceable in the axial direction. The inner pad 4a is disposed on the inner side in the axial direction of the rotor 8 and is supported by the support 2 in a way of being displaceable in the axial direction.

Each of the outer pad 4a and the inner pad 4b includes a lining (friction material) 13 and a metal back plate (pressure plate) 14 supporting a back surface of the lining 13.

<Caliper>

The caliper 3 is made of aluminum alloy or iron alloy and has an inverted U shape. The caliper 3 includes a pressing portion 15 on an outer side in the axial direction thereof and a clamp base 16 on an inner side in the axial direction thereof. The caliper 3 includes a bridge portion 17 disposed on the outer side in the radial direction of the rotor 8 and connecting the pressing portion 15 and the clamp base 16 in the axial direction.

The clamp base 16 includes a base body 18 and a pair of arms 19a and 19b extending from the base body 18 toward both outer sides in the circumferential direction. The base body 18 is provided with the first cylinder 20a and the second cylinder 20b, each of which is a substantially cylindrical space, therein. The first cylinder 20a and the second cylinder 20b are open toward the outer side in the axial direction, but openings toward the inner side in the axial direction are closed by bottom portions 21a and 21b.

The first piston 5a is fitted in the first cylinder 20a, and the second piston 5b is fitted in the second cylinder 20b. The first piston 5a and the second piston 5b are made of carbon steel such as S10C or S45C, and has a bottomed cylindrical shape.

Inner peripheral surfaces of the first piston 5a and the second piston 5b are provided with female splines 23a and 23b, respectively. Annular piston seals 24a and 24b are provided to seal an intermediate portion between an outer peripheral surface of the first piston 5a and an inner peripheral surface of the first cylinder 20a, and an intermediate portion between an outer peripheral surface of the second piston 5b and an inner peripheral surface of the second cylinder 20b, respectively. The piston seals 24a and 24b are mounted in seal grooves 25a and 25b formed on inner peripheral surfaces of portions on the outer side in the axial direction of the first cylinder 20a and the second cylinder 20b, respectively.

Portions on the outer side in the axial direction of the first piston 5a and the second piston 5b are suppressed from rotating with respect to the back plate 14 of the inner pad 4b by an anti-rotation mechanism (not shown). Piston boots 26a and 26b are stretched over an intermediate portion between a portion on the outer side in the axial direction of the outer peripheral surface of the first piston 5a and an opening edge portion on the outer side in the axial direction of the first cylinder 20a, and an intermediate portion between a portion on the outer side in the axial direction of the outer peripheral surface of the second piston 5b and an opening edge portion on the outer side in the axial direction of the second cylinder 20b, respectively.

The caliper 3 is supported by the support 2 in a way of being displaceable in the axial direction. For this purpose, end portions on the inner side in the axial direction of guide pins 27a and 27b are fixed to the pair of arms 19a and 19b constituting the clamp base 16, respectively, and from end portions on the outer side in the axial direction of the guide pins 27a and 27b to middle portions thereof are inserted into guide holes formed in the pair of connecting arms 11a and 11b constituting the support 2 in a way of being relatively displaceable in the axial direction, respectively. Boots 28a and 28b are bridged between outer peripheral surfaces of the guide pins 27a and 27b and openings of the guide holes, respectively.

<Rotary-to-Linear Motion Conversion Mechanism>

Figure 6:
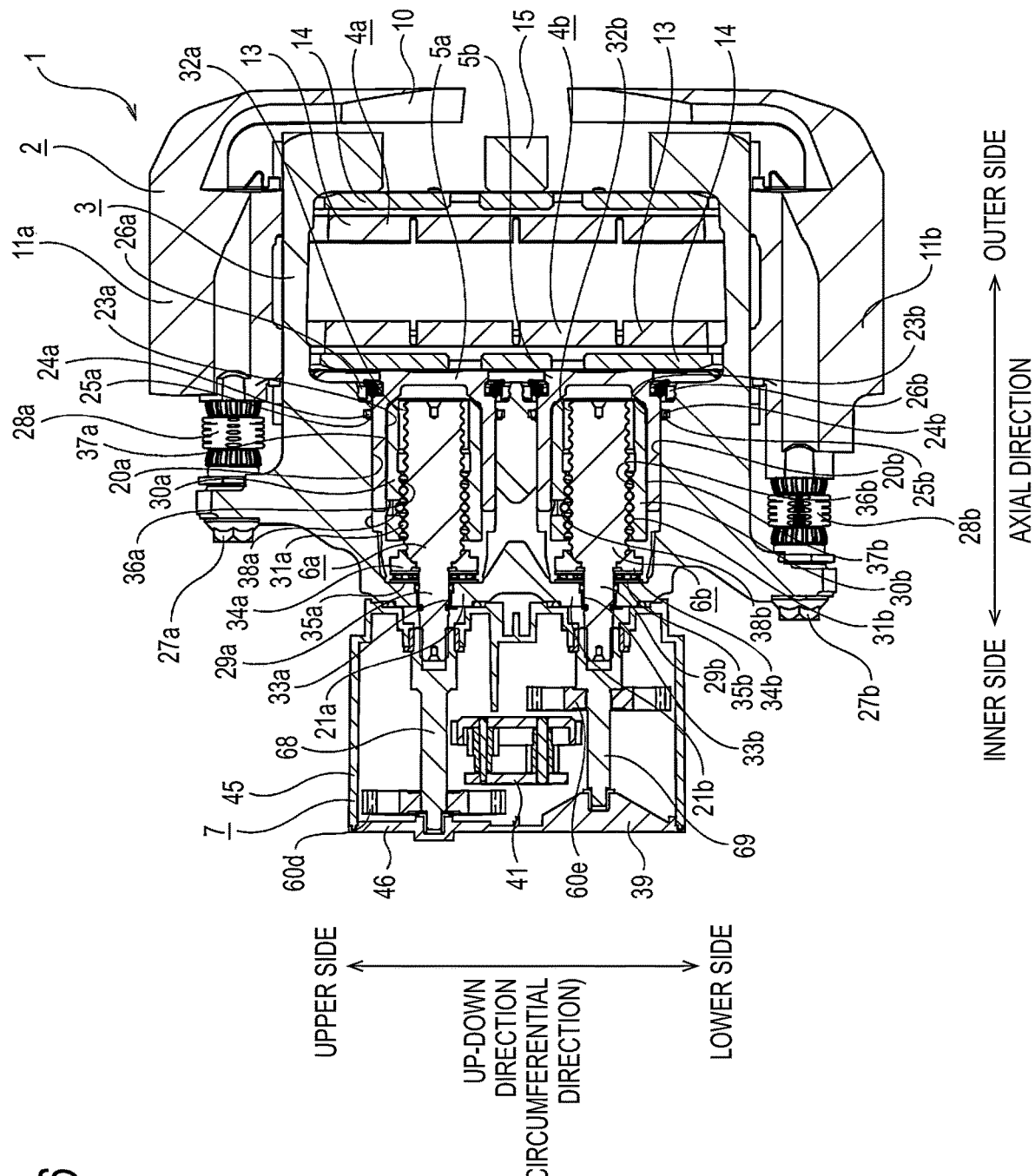
FIG. 6 is a cross-sectional view taken along a line A-A of FIG. 1.
Figure 7:
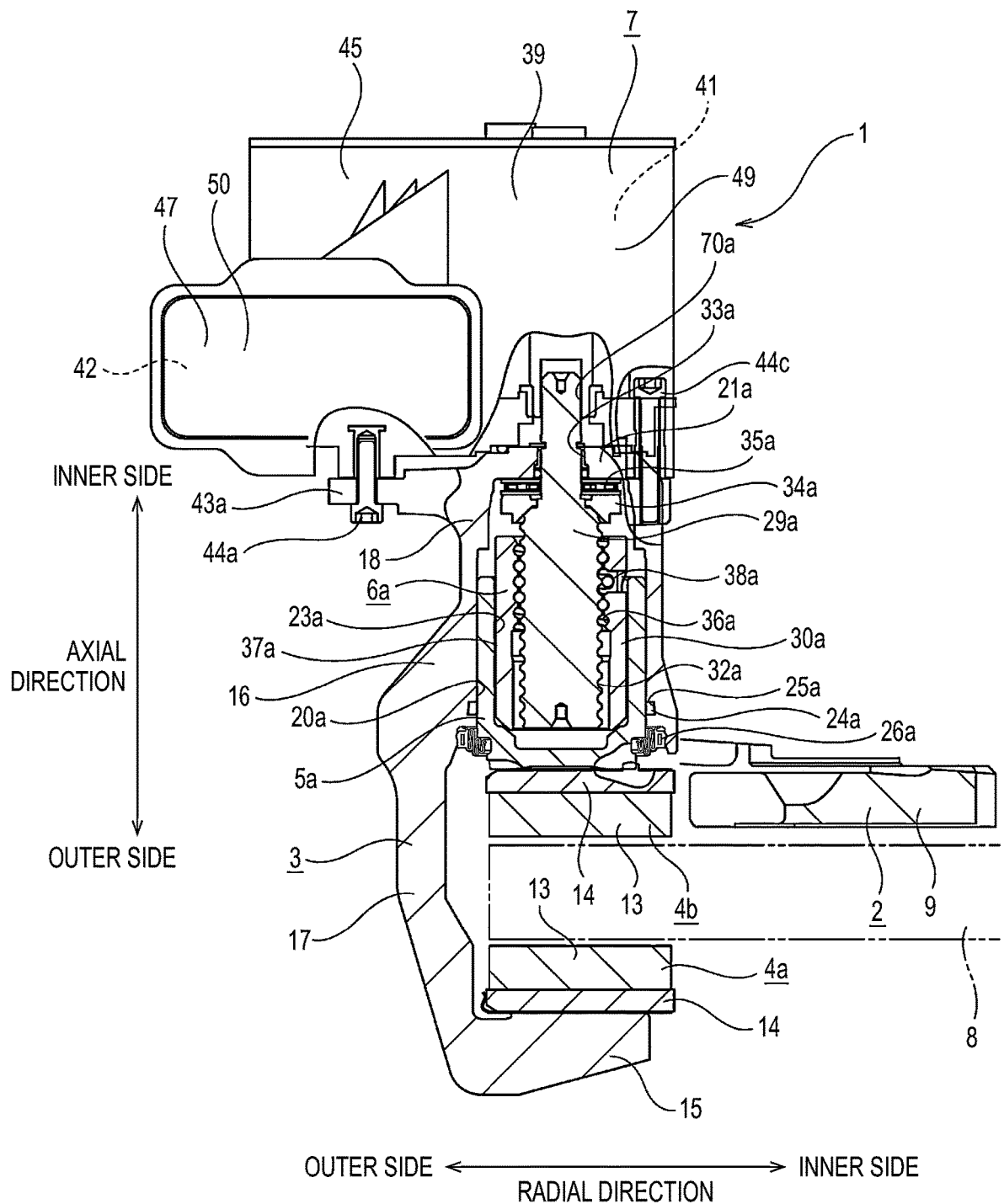
FIG. 7 is a cross-sectional view taken along a line B-B of FIG. 1.

As shown in FIGS. 6 and 7, each of the first rotary-to-linear motion conversion mechanism 6a and the second rotary-to-linear motion conversion mechanism 6b is a feed screw mechanism (ball screw device) that converts rotary motion into linear motion and changes an overall length thereof in the axial direction during operation, and includes spindles 29a and 29b as rotation members, nuts 30a and 30b as linear motion members, and a plurality of balls 31a and 31b. The first rotary-to-linear motion conversion mechanism 6a pushes the first piston 5a toward the rotor 8, and the second rotary-to-linear motion conversion mechanism 6b pushes the second piston 5b toward the rotor 8. During implementation of the present invention, it is also possible to use a sliding type feed screw device in which the spindle and the nut are brought into direct contact with each other without interposition of balls.

The spindles 29a and 29b include outer peripheral surfaces extending from tip portions (portions on the outer side in the axial direction) to middle portions thereof provided with spiral shaft-side ball screw grooves 32a and 32b, respectively. Base end portions (portions on the inner side in the axial direction) of the spindles 29a and 29b are inserted into through holes 33a and 33b formed in the bottom portions 21a and 21b of the clamp base 16, and are connected to tip portions of a first output shaft 68 and a second output shaft 69, which will be described later, in a way of not being relatively rotatable, respectively.

Bearing rings 34a and 34b having an annular shape are externally fitted to proximal end portions of the spindles 29a and 29b in a way of not being relatively rotatable, respectively. Thrust bearings 35a and 35b are disposed between surfaces on the inner side in the axial direction of the bearing rings 34a and 34b and surfaces on the outer side in the axial direction of the bottom portions 21a and 21b, respectively. In this way, the bottom portions 21a and 21b can support a load in the axial direction (an axial force) applied to the spindles 29a and 29b, and the spindles 29a and 29b can rotate relative to the bottom portions 21a and 21b, respectively.

The nuts 30a and 30b include inner peripheral surfaces formed with spiral nut-side ball screw grooves 36a and 36b, and outer peripheral surfaces formed with male splines 37a and 37b. The nut 30a spline-engages the male spline 37a with the female spline 23a provided on the first piston 5a in a state of being disposed on the inner side of the first piston 5a. The nut 30b spline-engages the male spline 37b with the female spline 23b provided on the second piston 5b in a state of being disposed on the inner side of the second piston 5b. In this way, the nut 30a is engaged with the first piston 5a in a way of being relatively displaceable in the axial direction but not relatively rotatable, and the nut 30b is engaged with the second piston 5b in a way of being relatively displaceable in the axial direction but not relatively rotatable.

The plurality of balls 31a and 31b are disposed in a rolling manner on inner sides of spiral load paths formed between the shaft-side ball screw grooves 32a and 32b and nut-side ball screw grooves 36a and 36b, respectively. Start points and end points of the load paths are connected by circulation components 38a and 38b fixed to the nuts 30a and 30b.

The first rotary-to-linear motion conversion mechanism 6a and the second rotary-to-linear motion conversion mechanism 6b according to the present embodiment rotationally drive the spindles 29a and 29b to move the nuts 30a and 30b in the axial direction. Specifically, when the spindles 29a and 29b are rotationally driven in a forward rotation direction, the nuts 30a and 30b are moved toward the rotor 8 (the outer side in the axial direction). On the other hand, when the spindles 29a and 29b are rotationally driven in a reverse rotation direction, the nuts 30a and 30b are moved away from the rotor 8 (the inner side in the axial direction).

<Motor Gear Unit>

The motor gear unit (MGU, electric drive unit) 7 is used for electrically driving the first rotary-to-linear motion conversion mechanism 6a and the second rotary-to-linear motion conversion mechanism 6b, and includes a housing 39, an electric motor 40, a reduction mechanism 41, and a non-excited operation type brake 42. The non-excited operation type brake 42 corresponds to a non-excited operation type brake for a brake device recited in claims.

<Housing>

The housing 39 is made of synthetic resin or metal, and is supported by and fixed to the clamp base 16 that constitutes the caliper 3. Specifically, the housing 39 is supported by and fixed to the inner side in the axial direction of the clamp base 16 by using mounting bolts 44a and 44b inserted through a pair of mounting flanges 43a and 43b provided on the outer peripheral surface of the clamp base 16, and a mounting bolt 44c inserted through a portion on the inner side in the radial direction of the housing 39 in the axial direction.

The housing 39 is constituted by a housing body 45, a closing plate 46, and a lid 47. The housing body 45 includes a motor accommodating portion 48, a gear accommodating portion 49, and a brake accommodating portion 50, each of which is hollow.

The motor accommodating portion 48 is a portion that accommodates the electric motor 40 inside. In the illustrated example, the motor accommodating portion 48 has a cylindrical shape with an inner diameter that is slightly larger than an outer diameter of a motor body 53 that constitutes the electric motor 40, which will be described later.

The gear accommodating portion 49 is a portion that accommodates the reduction mechanism 41 inside. In the illustrated example, the gear accommodating portion 49 is configured as a housing having a volume larger than that of the motor accommodating portion 48.

Figure 8:
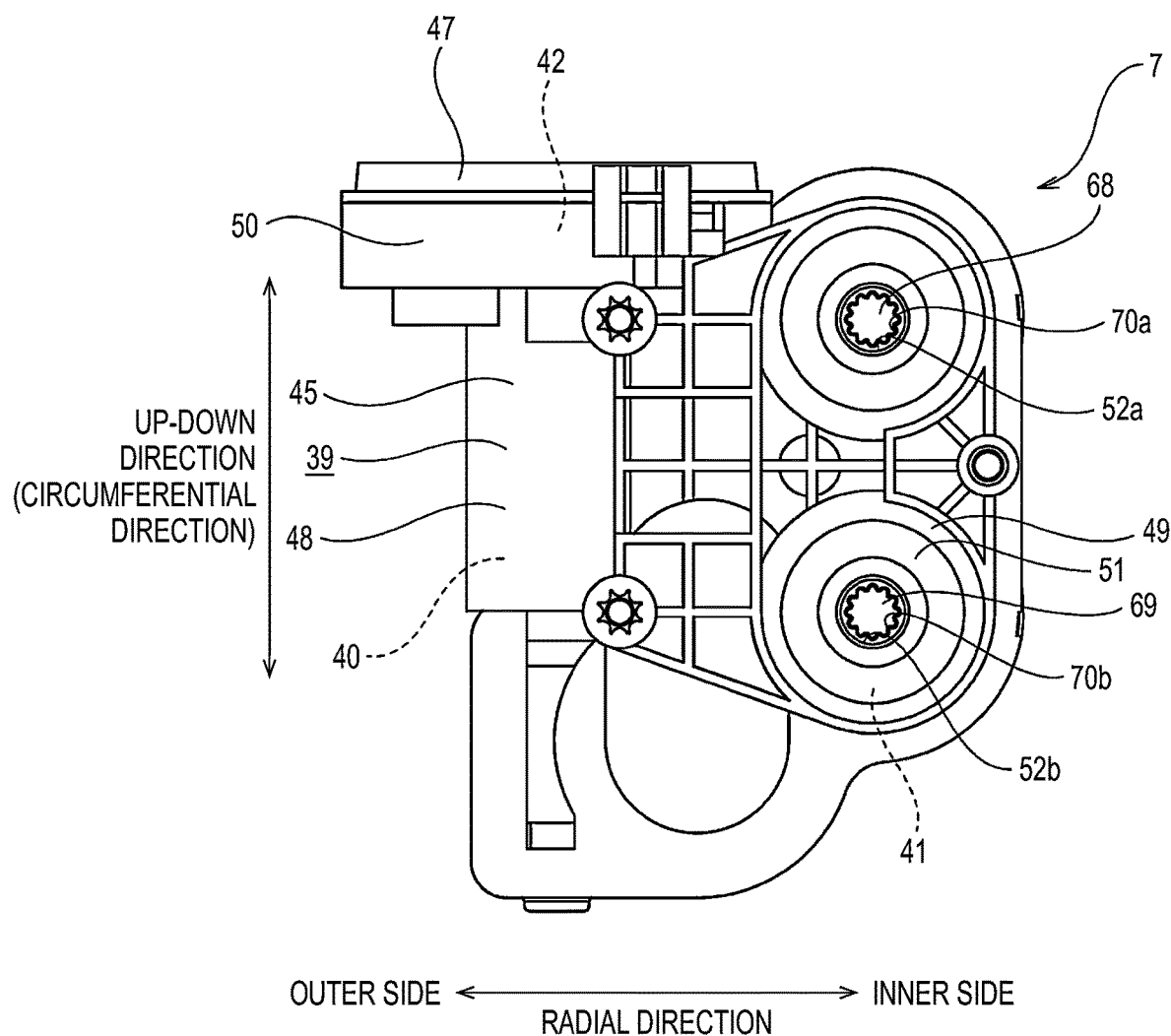
FIG. 8 is a front view of a motor gear unit removed from the disc brake device according to the first embodiment as viewed from the outside of the vehicle body.
Figure 9:
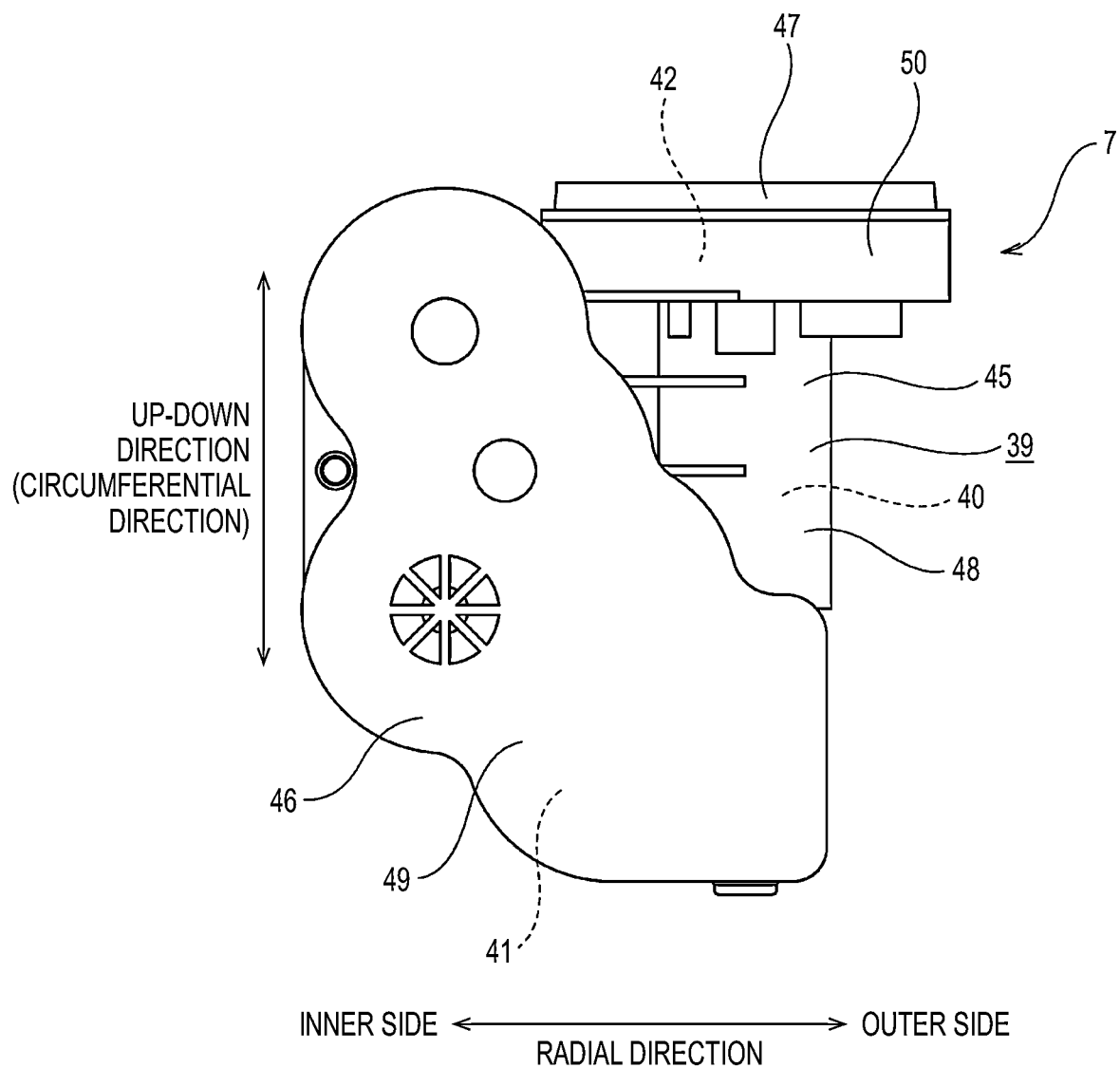
FIG. 9 is a rear view of the motor gear unit removed from the disc brake device according to the first embodiment as viewed from the central side of the vehicle body.
Figure 10:
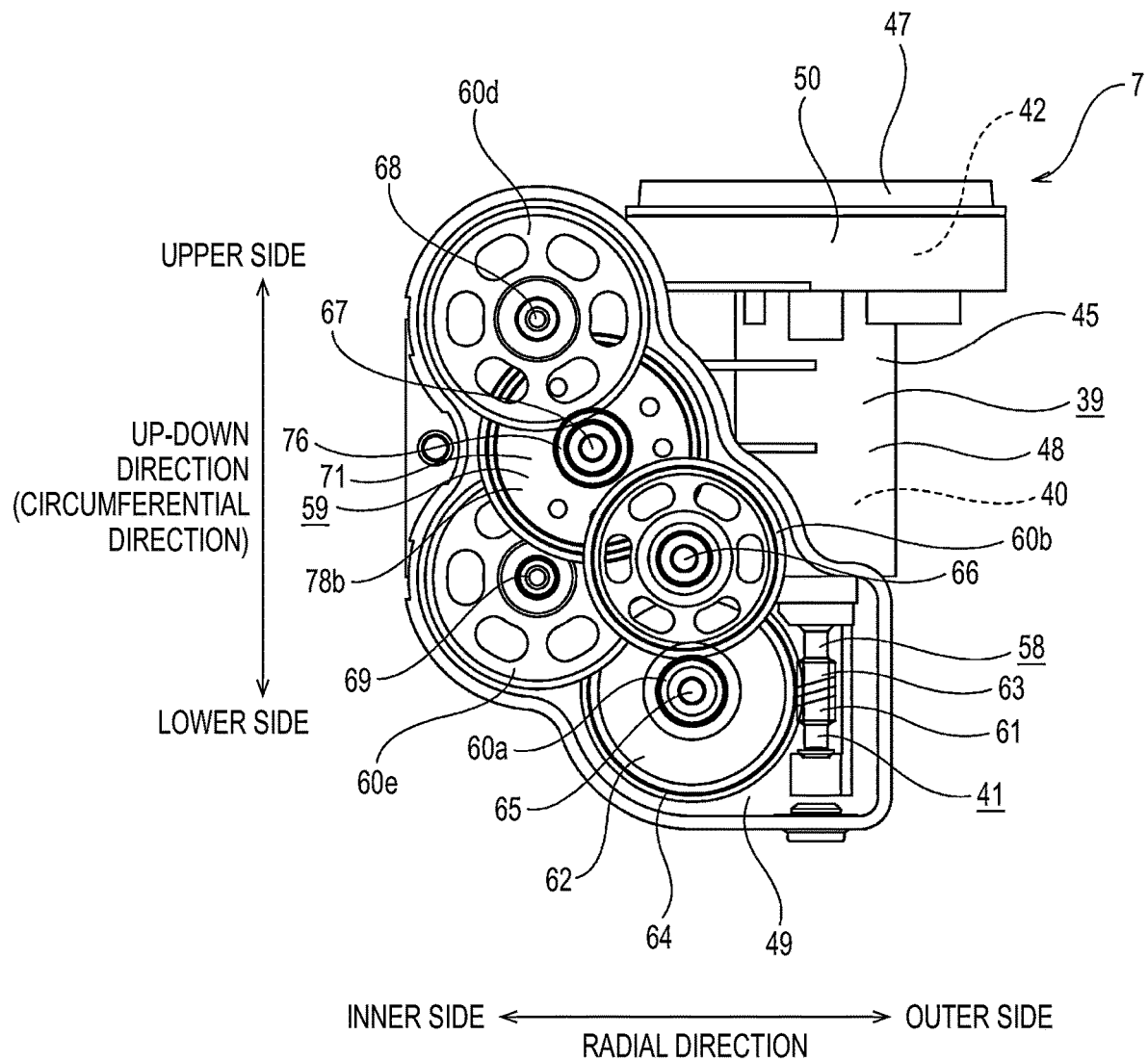
FIG. 10 is a rear view of the motor gear unit according to the first embodiment, with a closing plate removed from the state shown in FIG. 9.

As shown in FIG. 8, two insertion holes 52a and 52b into which the base end portions of the spindles 29a and 29b can be inserted are opened on a side wall portion 51 forming a surface on the inner side in the axial direction of the gear accommodating portion 49. Central axes of the insertion holes 52a and 52b are arranged in the axial direction. An opening on the inner side in the axial direction of the gear accommodating portion 49 is closed by the closing plate 46.

The brake accommodating portion 50 is a portion that accommodates the non-excited operation type brake 42 inside. In the illustrated example, the brake accommodating portion 50 is configured in a shape of a rectangular housing. An upper opening of the brake accommodating portion 50 is closed by the lid 47.

<Electric Motor>

Figure 13:
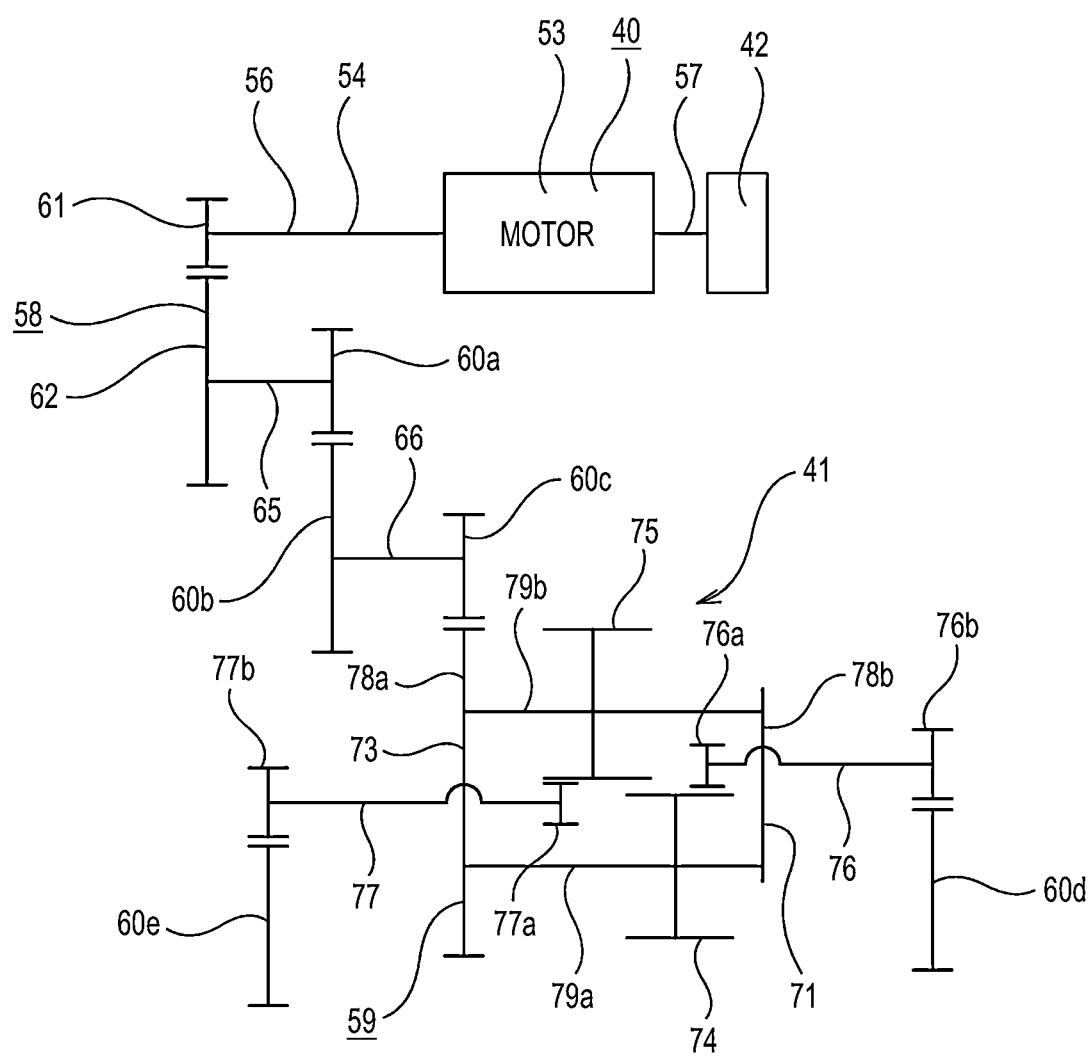
FIG. 13 is a schematic diagram illustrating a reduction mechanism according to the first embodiment.
Figure 14:
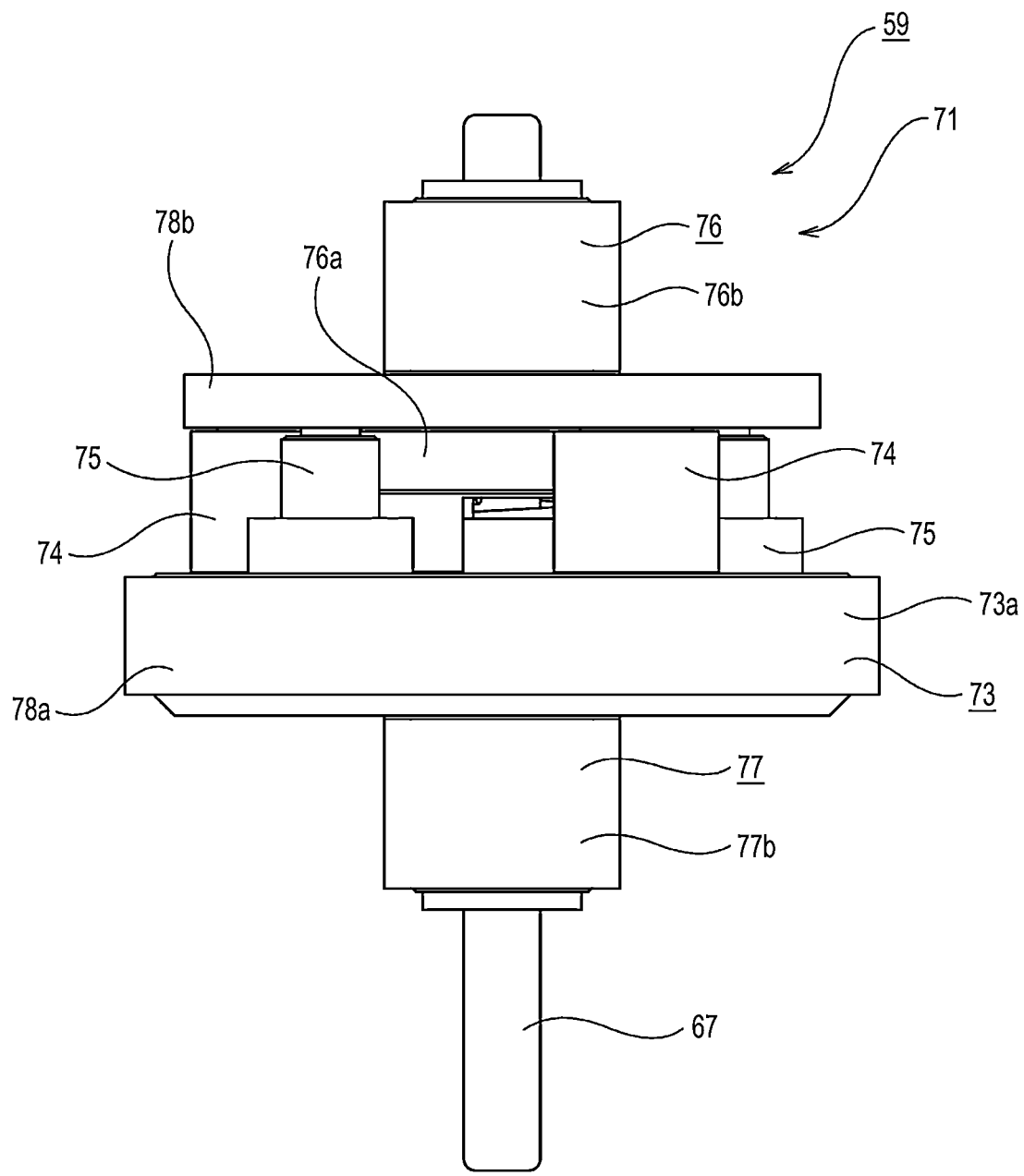
FIG. 14 is a view of a power distribution mechanism according to the first embodiment in a state of being taken out as viewed from an outer side in a radial direction of a support shaft.
Figure 15:
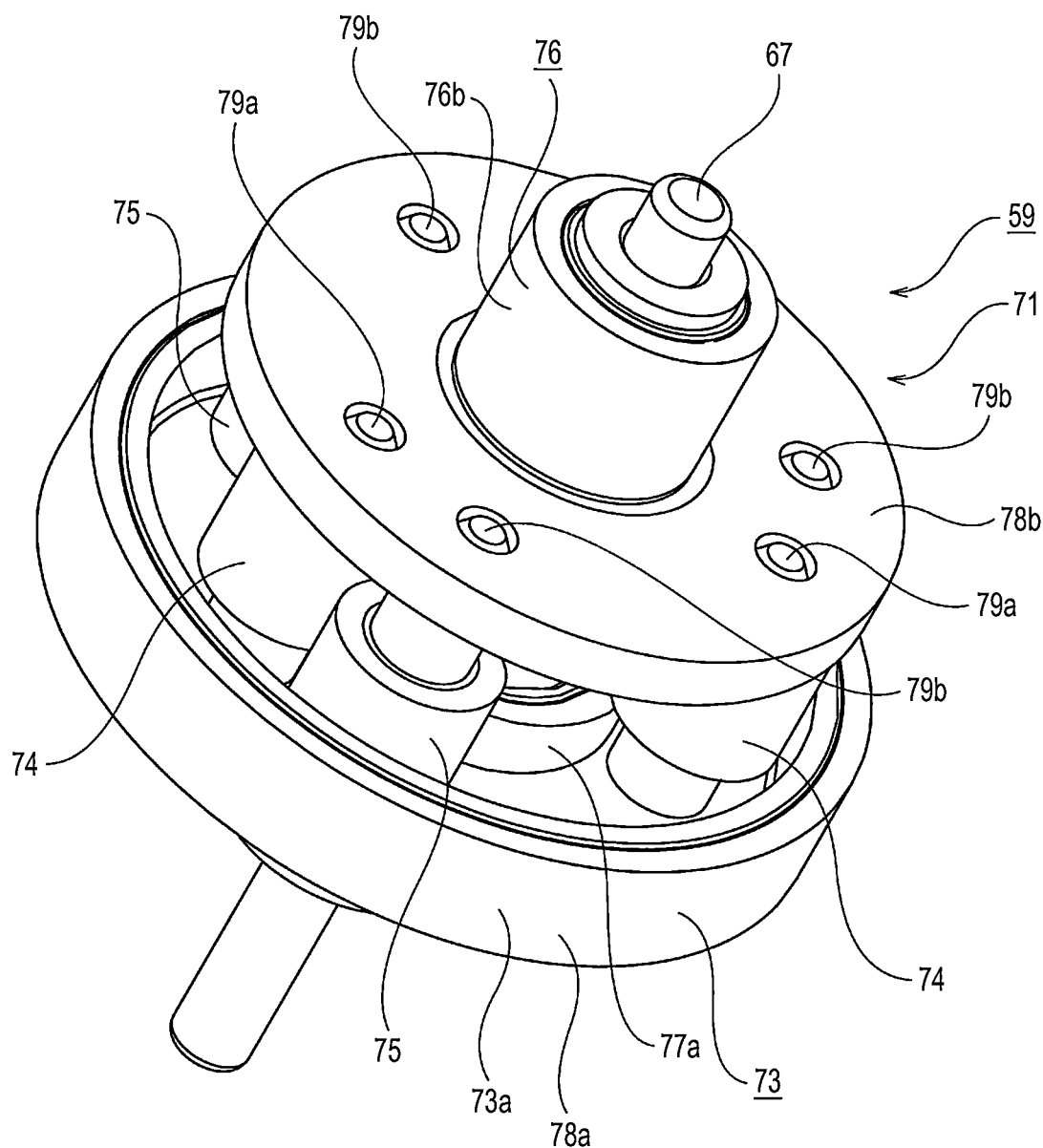
FIG. 15 is a perspective view of the power distribution mechanism according to the first embodiment in the state of being taken out.
Figure 16:
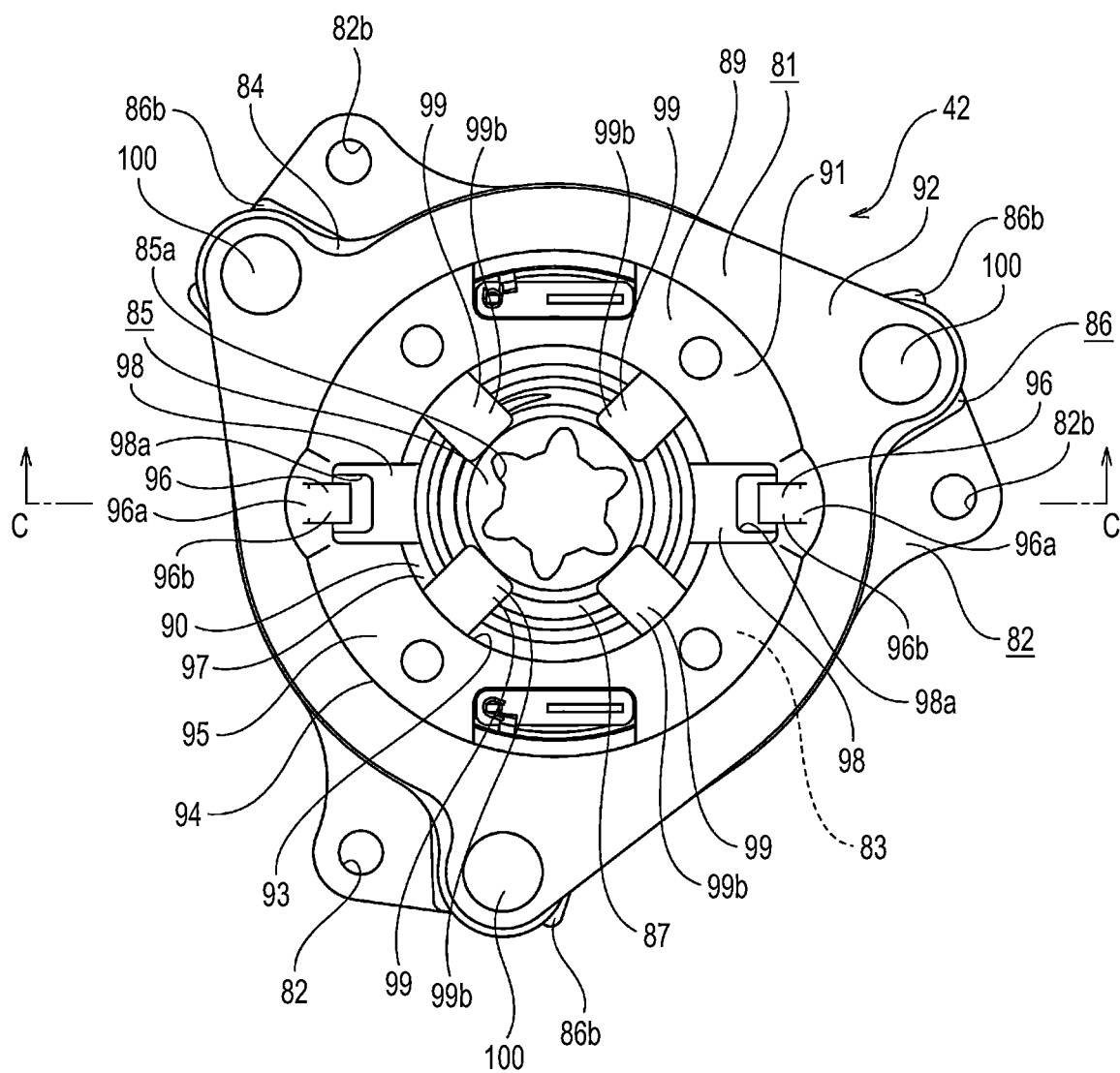
FIG. 16 is a view of a non-excited operation type brake according to the first embodiment in a state of being taken out as viewed from an axial direction of a motor shaft.
Figure 17:
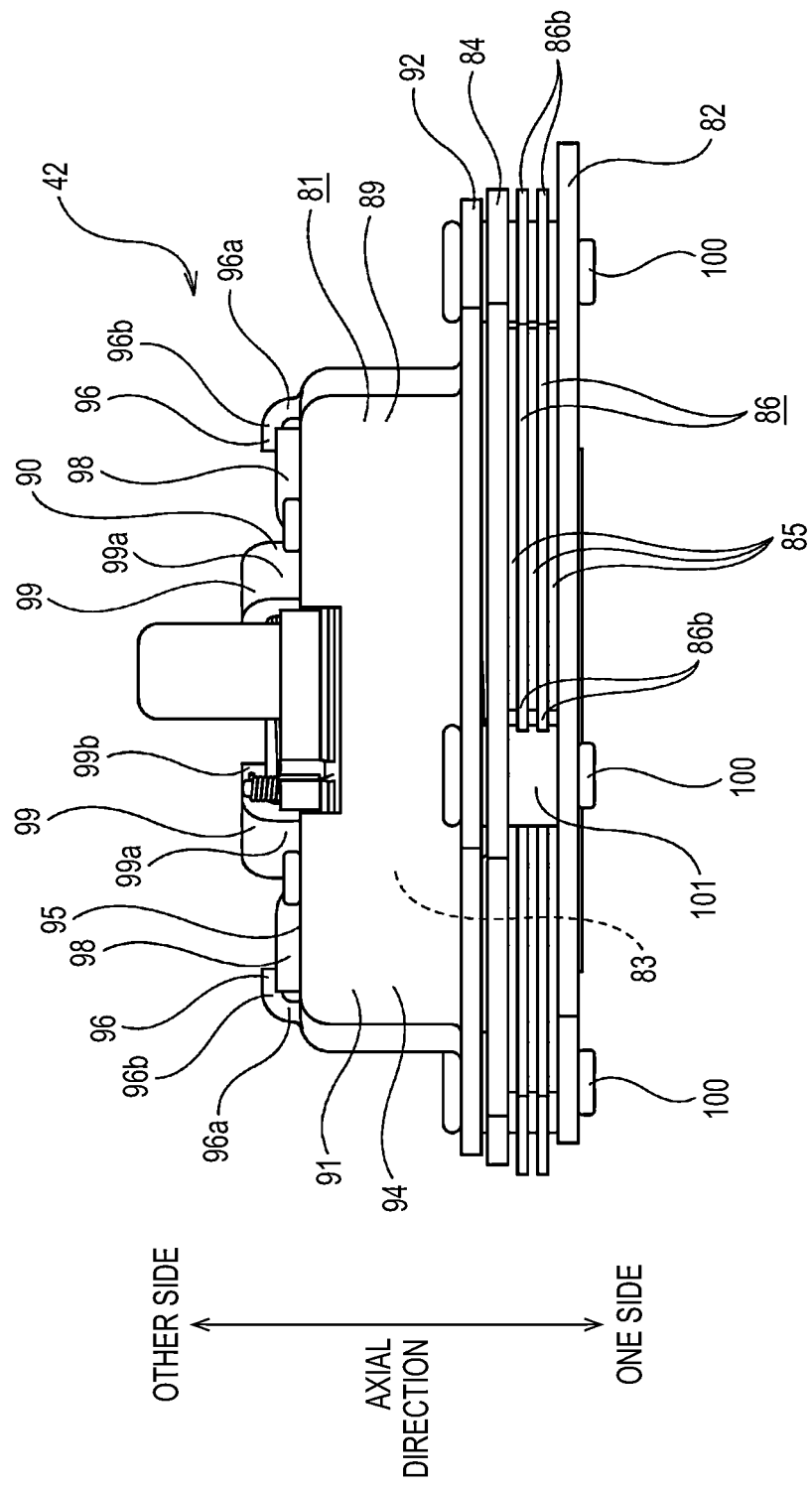
FIG. 17 is a view of the non-excited operation type brake according to the first embodiment in the state of being taken out as viewed from an outer side in a radial direction of the motor shaft.
Figure 18:
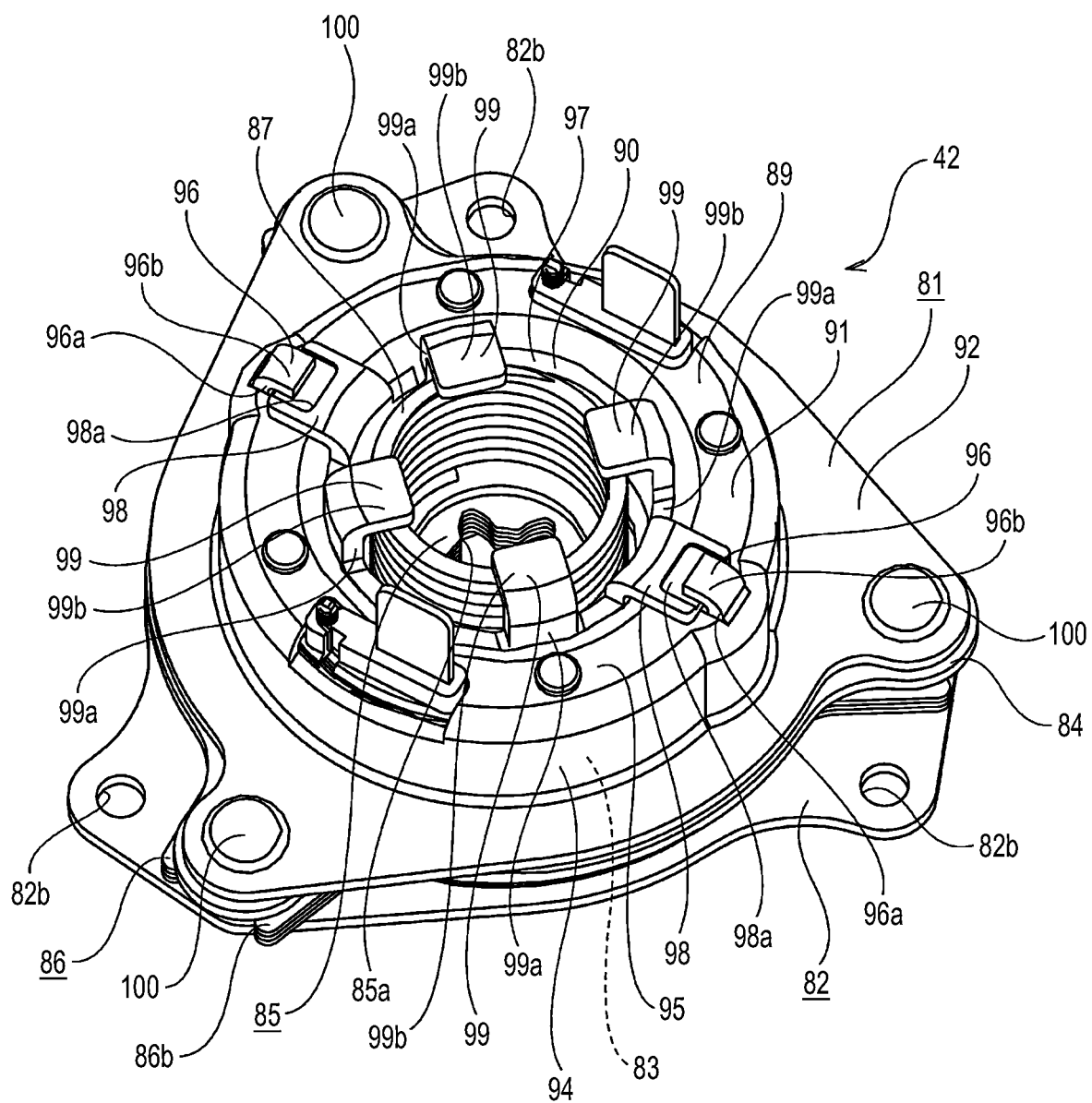
FIG. 18 is a perspective view of the non-excited operation type brake according to the first embodiment in the state of being taken out.
Figure 19:
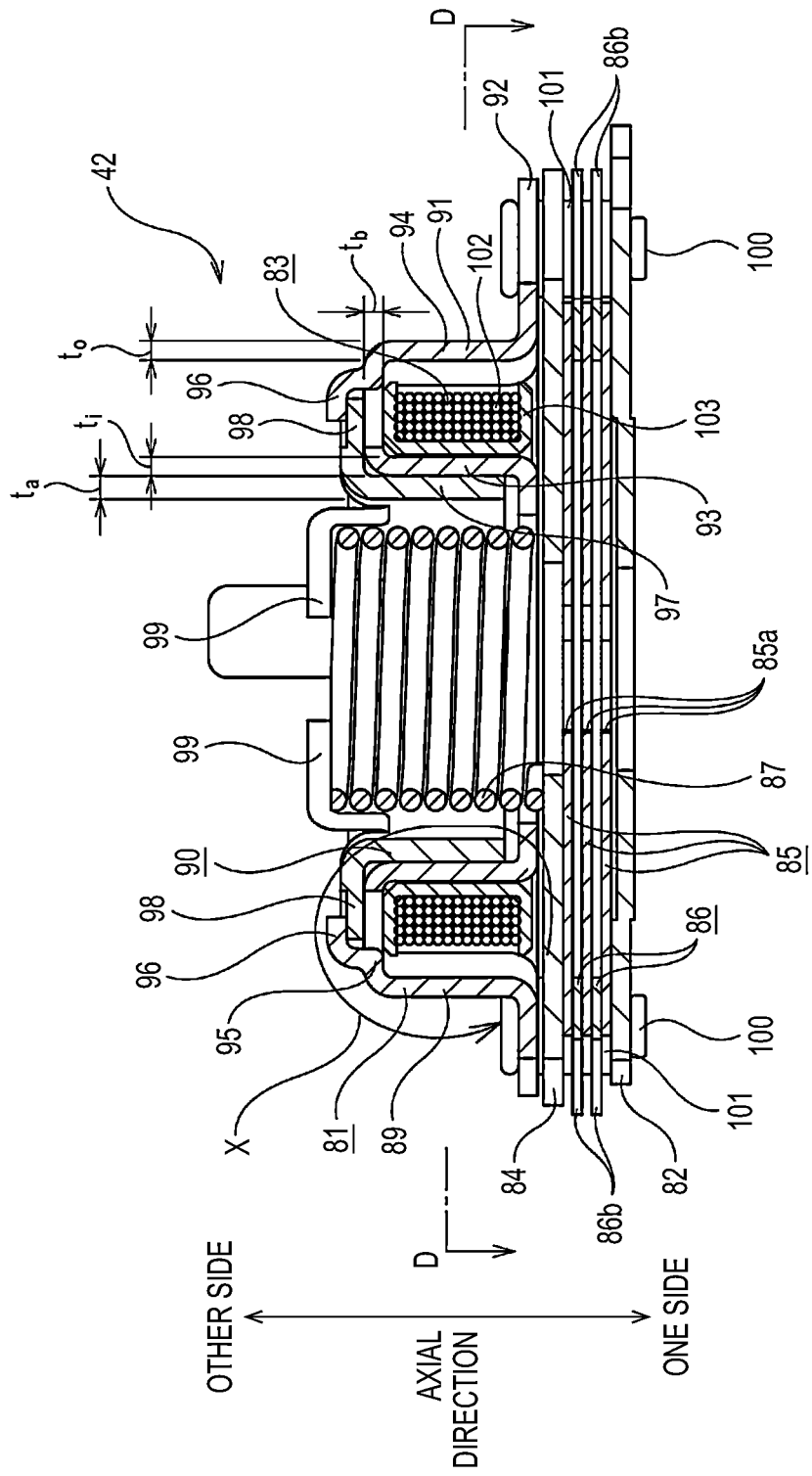
FIG. 19 is a cross-sectional view taken along a line C-C of FIG. 16.
Figure 20:
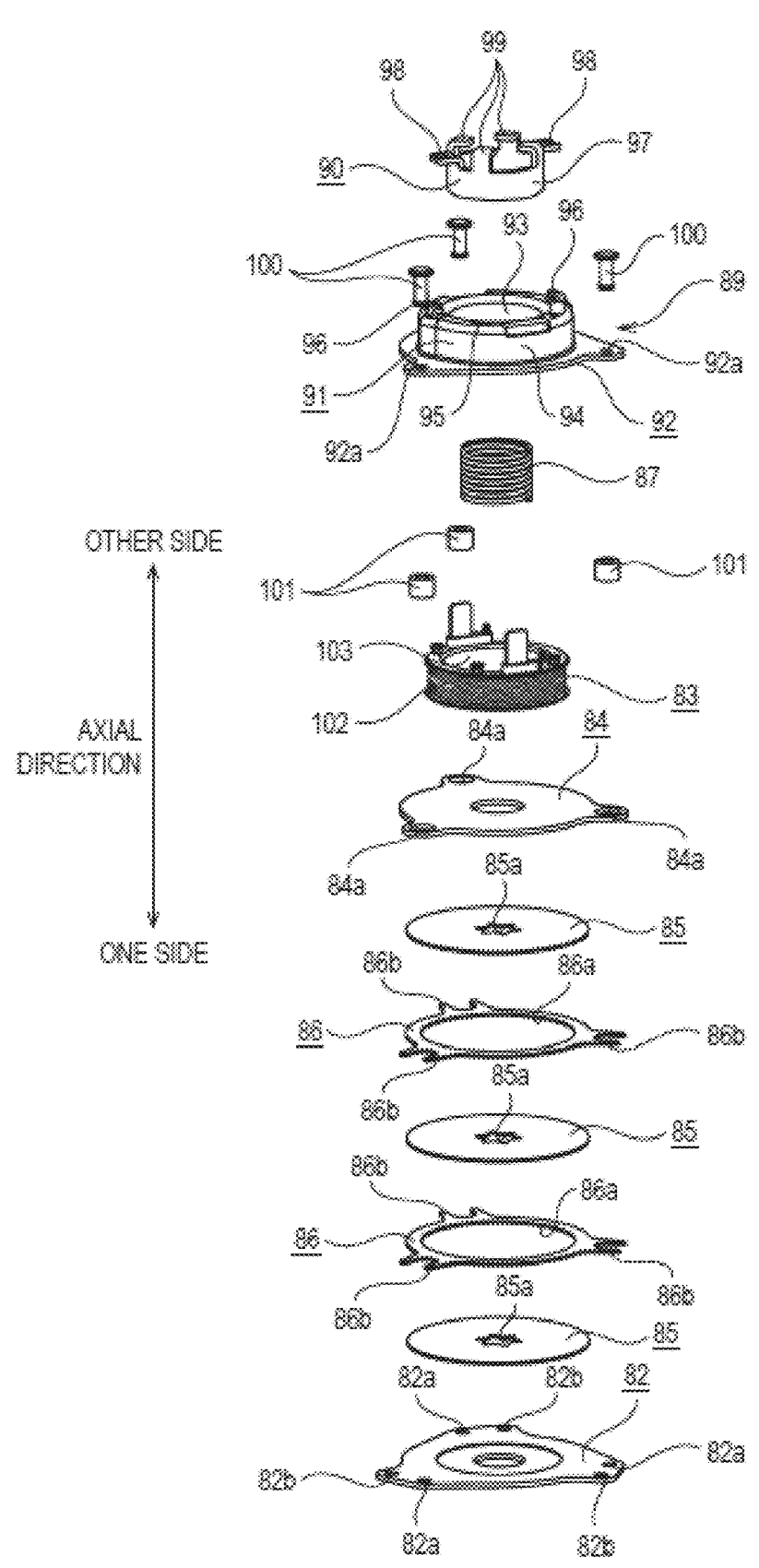
FIG. 20 is an exploded perspective view of the non-excited operation type brake according to the first embodiment in the state of being taken out.

The electric motor 40 is disposed inside the motor accommodating portion 48. The electric motor 40 includes the motor body 53 and a motor shaft 54. Note that FIG. 13 schematically shows these components (the motor body 53 and the motor shaft 54).

The motor body 53 includes a motor housing 55 having a cylindrical shape, and a rotor and stator (not shown) disposed inside the motor housing 55. The rotor is supported by a middle portion in the axial direction of the motor shaft 54. The stator is disposed around the rotor and supported by an inner side of the motor housing 55.

Both end portions in the axial direction of the motor shaft 54 protrude from the motor body 53 toward both sides in the axial direction. The motor shaft 54 includes a shaft-shaped first connection portion 56 connected to the reduction mechanism 41 at an end portion on one side in the axial direction projecting from the motor body 53. The motor shaft 54 includes a shaft-shaped second connection portion 57 connected to the non-excited operation type brake 42 at an end portion on the other side in the axial direction projecting from the motor body 53. The electric motor 40 rotates the motor shaft 54 by a predetermined angle in a predetermined direction based on a command signal from a control device (not shown).

<Reduction Mechanism>

The reduction mechanism 41 increases a torque (power) of the electric motor 40 and then transmits to the first rotary-to-linear motion conversion mechanism 6a and the second rotary-to-linear motion conversion mechanism 6b. Therefore, the reduction mechanism 41 transmits rotation of the electric motor 40 to the two spindles 29a and 29b. The reduction mechanism 41 is accommodated inside the gear accommodating portion 49.

The reduction mechanism 41 includes a worm reduction mechanism 58, a power distribution mechanism (differential) 59, and a plurality of gears (spur gears) 60a to 60e. Note that FIG. 13 schematically shows a part of components of the reduction mechanism 41 (the worm reduction mechanism 58, the power distribution mechanism 59, and the plurality of gears 60a to 60e).

(Worm Reduction Mechanism)

The worm reduction mechanism 58 is connected to the first connection portion 56 of the motor shaft 54 that constitutes the electric motor 40. The worm reduction mechanism 58 includes a worm 61 and a worm wheel 62 and does not have a self-locking function. Therefore, the worm reduction mechanism 58 according to the present embodiment not only transmits the rotation of the electric motor 40 to the first rotary-to-linear motion conversion mechanism 6a and the second rotary-to-linear motion conversion mechanism 6b, but also transmits rotation reversely input from the first rotary-to-linear motion conversion mechanism 6a and the second rotary-to-linear motion conversion mechanism 6b, to the motor shaft 54 of the electric motor 40.

The worm 61 includes worm teeth 63 formed on a middle portion in the axial direction of an outer peripheral surface thereof, and is disposed coaxially with the motor shaft 54 of the electric motor 40. An end portion on the other side in the axial direction (base end portion) of the worm 61 is fixed to the first connection portion 56 of the motor shaft 54 in a way of being not relatively rotatable. An end portion on one side in the axial direction of the worm 61 is supported, in a rotatable manner, by the inner side of the gear accommodating portion 49 via a bearing (not shown).

The worm wheel 62 includes an outer peripheral surface provided with wheel teeth 64. The wheel teeth 64 mesh with the worm teeth 63 provided on the worm 61. The worm wheel 62 is fixed by external fitting to a first intermediate shaft 65 supported in a rotatable manner by the inner side of the gear accommodating portion 49, in a way of being not relatively rotatable. The first intermediate shaft 65 is disposed substantially parallel to central axes of the spindle 29a of the first rotary-to-linear motion conversion mechanism 6a and the spindle 29b of the second rotary-to-linear motion conversion mechanism 6b. Therefore, a rotation center axis of the worm wheel 62 is disposed substantially parallel to the center axes of the spindles 29a and 29b. Note that "substantially parallel" means not only completely parallel but also almost parallel.

In addition to the first intermediate shaft 65, a second intermediate shaft 66, a support shaft 67, a first output shaft 68, and a second output shaft 69 are supported by the inner side of the gear accommodating portion 49. The second intermediate shaft 66, the support shaft 67, the first output shaft 68, and the second output shaft 69 are disposed substantially parallel to the first intermediate shaft 65. The first intermediate shaft 65, the second intermediate shaft 66, the support shaft 67, the first output shaft 68, and the second output shaft 69 constitute the reduction mechanism 41, in which the support shaft 67 particularly constitutes the power distribution mechanism 59.

The first gear 60a is fixed by external fitting to the first intermediate shaft 65 at a portion displaced from the worm wheel 62 in the axial direction, in a way of being not relatively rotatable. The first gear 60a has fewer teeth than the wheel teeth 64 and meshes with the second gear 60b that is fixed by external fitting to the second intermediate shaft 66 in a way of being not relatively rotatable. The third gear 60c having fewer teeth than the second gear 60b is fixed by externally fitting to the second intermediate shaft 66 at a portion displaced from the second gear 60b in the axial direction in a way of being not relatively rotatable. The third gear 60c meshes with an input carrier 73, which constitutes the power distribution mechanism 59 and will be described later. Therefore, the power distribution mechanism 59 is located downstream of the worm reduction mechanism 58 with respect to a power transmission direction of the electric motor 40.

The fourth gear 60d as a final gear is fixed by external fitting to the first output shaft 68, and the fifth gear 60e as a final gear is fixed by external fitting to the second output shaft 69. The fourth gear 60d meshes with a first output member 76, which constitutes the power distribution mechanism 59 and will be described later, and the fifth gear 60e meshes with a second output member 77, which constitutes the power distribution mechanism 59 and will be described later.

Engagement holes (serration holes) 70a and 70b are provided at end portions on the outer side in the axial direction of the first output shaft 68 and the second output shaft 69, respectively. In the present embodiment, end portions (base end portions) on the inner side in the axial direction of the spindles 29a and 29b constituting the first rotary-to-linear motion conversion mechanism 6a and the second rotary-to-linear motion conversion mechanism 6b are engaged with the engagement holes 70a and 70, respectively, in a way of being not relatively rotatable. In this way, the first output shaft 68 and the spindle 29a are coaxially connected to each other in a way of being not relatively rotatable. The second output shaft 69 and the spindle 29b are coaxially connected to each other in a way of being not relatively rotatable. Therefore, rotation center axes of the fourth gear 60d and the fifth gear 60e, which are the final gears, are disposed substantially parallel to (coaxially with) the center axes of the spindles 29a and 29b. During implementation of the present invention, the first output shaft and the spindle and/or the second output shaft and the spindle may be integral and the final gears may be directly connected to the spindles.

(Power Distribution Mechanism)

The power distribution mechanism 59 is disposed between the third gear 60c and the final gears, which are the fourth gear 60d and the fifth gear 60e. The power distribution mechanism 59 has a function of distributing and transmitting power input from the third gear 60c to the fourth gear 60d and the fifth gear 60e.

Specifically, the power distribution mechanism 59 distributes power to the fourth gear 60d and the fifth gear 60e according to magnitudes of rotational loads (ease of rotation) of the spindles 29a and 29b. As a result, regardless of a difference in efficiency between the first rotary-to-linear motion conversion mechanism 6a and the second rotary-to-linear motion conversion mechanism 6b, a difference is suppressed from generating between a force with which the first piston 5a presses the inner pad 4b generated by the first rotary-to-linear motion conversion mechanism 6a and a force with which the second piston 5b presses the inner pad 4b generated by the second rotary-to-linear motion conversion mechanism 6b.

The power distribution mechanism 59 includes one support shaft 67 and a gear train 71 arranged around the support shaft 67. The power distribution mechanism 59 is supported by the housing 39 by fixing end portions on both sides in the axial direction of the support shaft 67 to the housing 39, and is disposed inside the gear accommodating portion 49.

The gear train 71 is constituted by a plurality of gears (spur gears) and is unitized (sub-assembled) so as to be handled as a single component.

The gear train 71 includes the input carrier 73, a first intermediate gear 74, a second intermediate gear 75, the first output member 76, and the second output member 77. Note that the input carrier 73, the first output member 76, and the second output member 77 also include outer peripheral surfaces provided with gears including teeth portion.

The input carrier 73 includes a pair of support rings 78a and 78b each having an annular shape, and a plurality of pins 79a and 79b (six in total in the illustrated example) bridged between the pair of support rings 78a and 78b. The pair of support rings 78a and 78b are connected to each other by the plurality of pins 79a and 79b. One support ring 78a includes an outer peripheral surface provided with a teeth portion 73a that meshes with the third gear 60c, and the second output member 77 is inserted therein in a way of being relatively rotatable. The first output member 76 is inserted inside the other support ring 78b in a way of being relatively rotatable. The pins 79a and 79b are disposed parallel to the support shaft 67. As will be described later, the support shaft 67 is inserted through the inside of the first output member 76 and the second output member 77, so that the input carrier 73 is supported around the support shaft 67 in a rotatable manner via the first output member 76 and the second output member 77.

The first intermediate gear 74 and the second intermediate gear 75 are supported by the input carrier 73 in a rotatable manner. Specifically, the first intermediate gear 74 and the second intermediate gear 75 are supported around the pins 79a and 79b in a rotatable manner and disposed in an intermediate portion between the pair of support rings 78a and 78b. The first intermediate gear 74 and the second intermediate gear 75 are in mesh with each other.

The first output member 76 and the second output member 77 are disposed coaxially with each other while being spaced apart in the axial direction. The first output member 76 is supported around a portion on the inner side in the axial direction of the support shaft 67 in a rotatable manner, and the second output member 77 is supported around a portion on the outer side in the axial direction of the support shaft 67 in a rotatable manner.

The first output member 76 is configured in a hollow cylindrical shape, and includes an outer peripheral surface provided with an input teeth portion 76a and an output teeth portion 76b. The input teeth portion 76a meshes with the first intermediate gear 74. On the other hand, the output teeth portion 76b meshes with the fourth gear 60d. Therefore, rotation of the first output member 76 is transmitted to the first output shaft 68 through a meshing portion between the output teeth portion 76b and the fourth gear 60d.

The second output member 77 is configured in a hollow cylindrical shape, and includes an outer peripheral surface provided with an input teeth portion 77a and an output teeth portion 77b. The input teeth portion 77a meshes with the second intermediate gear 75. On the other hand, the output teeth portion 77b meshes with the fifth gear 60e. Therefore, rotation of the second output member 77 is transmitted to the second output shaft 69 through a meshing portion between the output teeth portion 77b and the fifth gear 60e.

In order to suppress the first output member 76 and the second output member 77 from rotating relative to each other when releasing the braking force of the parking brake (during differential pressure reduction), the power distribution mechanism 59 according to the present embodiment is provided with a biasing member (not shown) between the first output member 76 and the second output member 77. Note that during implementation of the present invention, couplings can be provided for a purpose of suppressing local wear of the first output member 76 and the second output member 77 due to sliding contact with the biasing member while maintaining a posture of the biasing member.

The power distribution mechanism 59 according to the present embodiment causes the first intermediate gear 74 and the second intermediate gear 75 to revolve when obtaining the braking force of the parking brake (during differential pressurization) by the input carrier 73 rotating around the support shaft 67.

When magnitudes of rotational loads of the first output member 76 and the second output member 77, that is, the magnitudes of the rotational loads (ease of rotation) of the spindles 29a and 29b are the same as each other, the first intermediate gear 74 and the second intermediate gear 75 do not rotate but only revolve while being meshed with each other, and transmit the revolution to the first output member 76 and the second output member 77. Therefore, the first output member 76 meshed with the first intermediate gear 74 and the second output member 77 meshed with the second intermediate gear 75 rotate in the same direction at the same speed. The case where the spindles 29a and 29b have the same rotational load refers to, for example, a state in which the spindles 29a and 29b rotate without load while the tip portions of the nuts 30a and 30b not pressing the first piston 5a and the second piston 5b, or a slightly pressurized state in which the tip portions of the nuts 30a and 30b begin to press the first piston 5a and the second piston 5b.

On the other hand, when the magnitudes of the rotational loads of the first output member 76 and the second output member 77, that is, the magnitudes of the rotational loads of the spindles 29a and 29b are different from each other, the first intermediate gear 74 and the second intermediate gear 75 not only rotate but also revolve while being meshed with each other, and transmit the revolution and the rotation to both or either one of the first output member 76 and the second output member 77. The case where the magnitudes of the rotational loads of the spindles 29a and 29b are different from each other occurs when the first piston 5a and the second piston 5b do not press the inner pad 4b at the same time and timings at which the first piston 5a and the second piston 5b press the inner pad 4b are shifted due to a difference in efficiency between the first rotary-to-linear motion conversion mechanism 6a and the second rotary-to-linear motion conversion mechanism 6b.

For example, when the first piston 5a presses the inner pad 4b before the second piston 5b, the rotational load of the spindle 29a constituting the first rotary-to-linear motion conversion mechanism 6a is larger than the rotational load of the spindle 29b constituting the second rotary-to-linear motion conversion mechanism 6b. In this case, the power distribution mechanism 59 distributes and transmits the rotation of the input carrier 73 to the first output member 76 and the second output member 77 such that a rotation speed of the first output member 76 is smaller than a rotation speed of the second output member 77. Conversely, when the second piston 5b presses the inner pad 4b before the first piston 5a, the rotational load of the spindle 29a constituting the first rotary-to-linear motion conversion mechanism 6a is smaller than the rotational load of the spindle 29b constituting the second rotary-to-linear motion conversion mechanism 6b. In this case, the power distribution mechanism 59 distributes and transmits the rotation of the input carrier 73 to the first output member 76 and the second output member 77 such that the rotation speed of the first output member 76 is larger than the rotation speed of the second output member 77.

When releasing the braking force of the parking brake (during differential pressure reduction), the power distribution mechanism 59 according to the present embodiment can suppress relative rotation between the first output member 76 and the second output member 77, and can simultaneously rotate both the first output member 76 and the second output member 77 in a direction opposite to that during pressurization by action of the biasing member. Therefore, both a pressing force from the first piston 5a to the inner pad 4b and a pressing force from the second piston 5b to the inner pad 4b can be made zero.

<Non-Excited Operation Type Brake>

Figure 11:
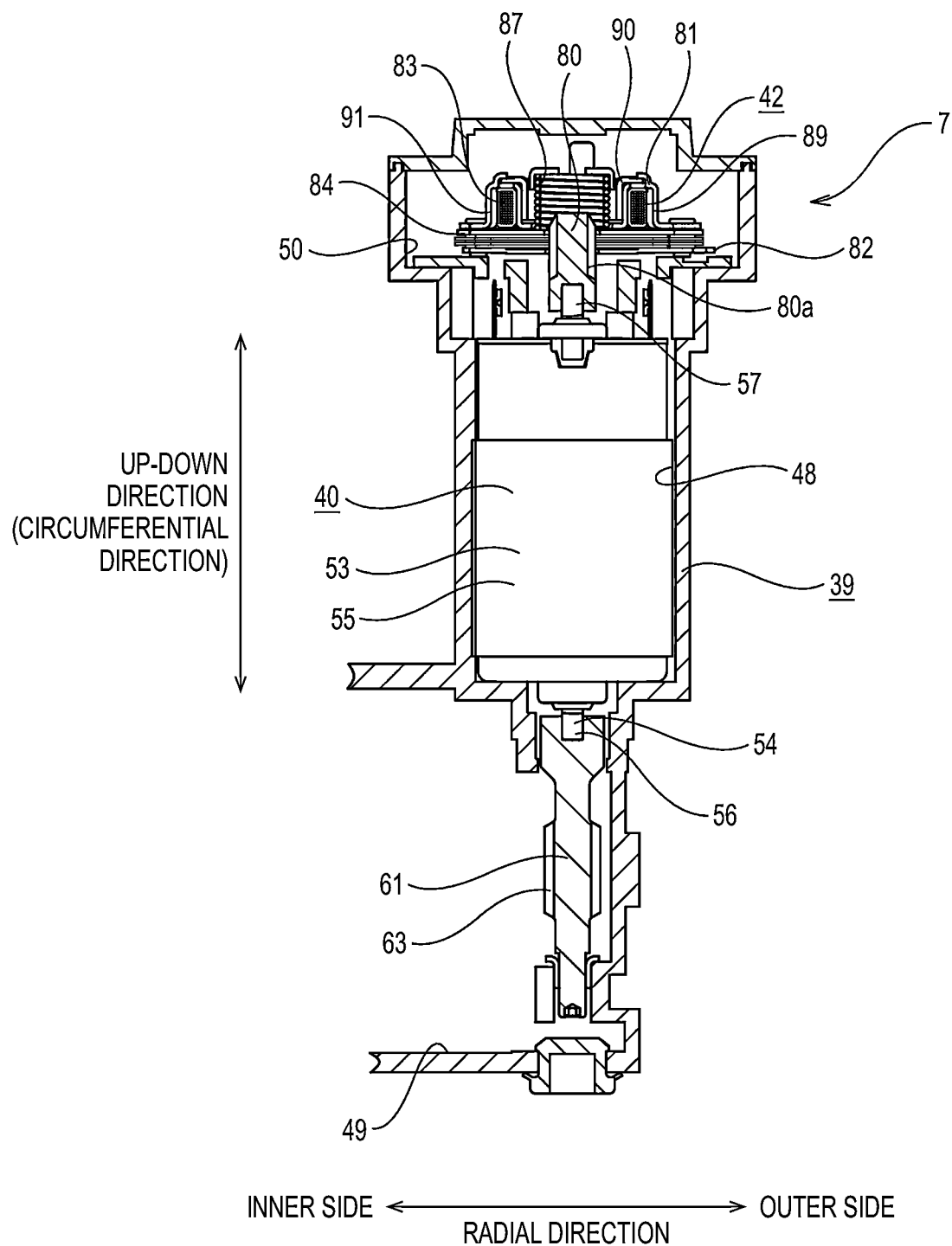
FIG. 11 is a partial cross-sectional view of the motor gear unit according to the first embodiment.
Figure 12:
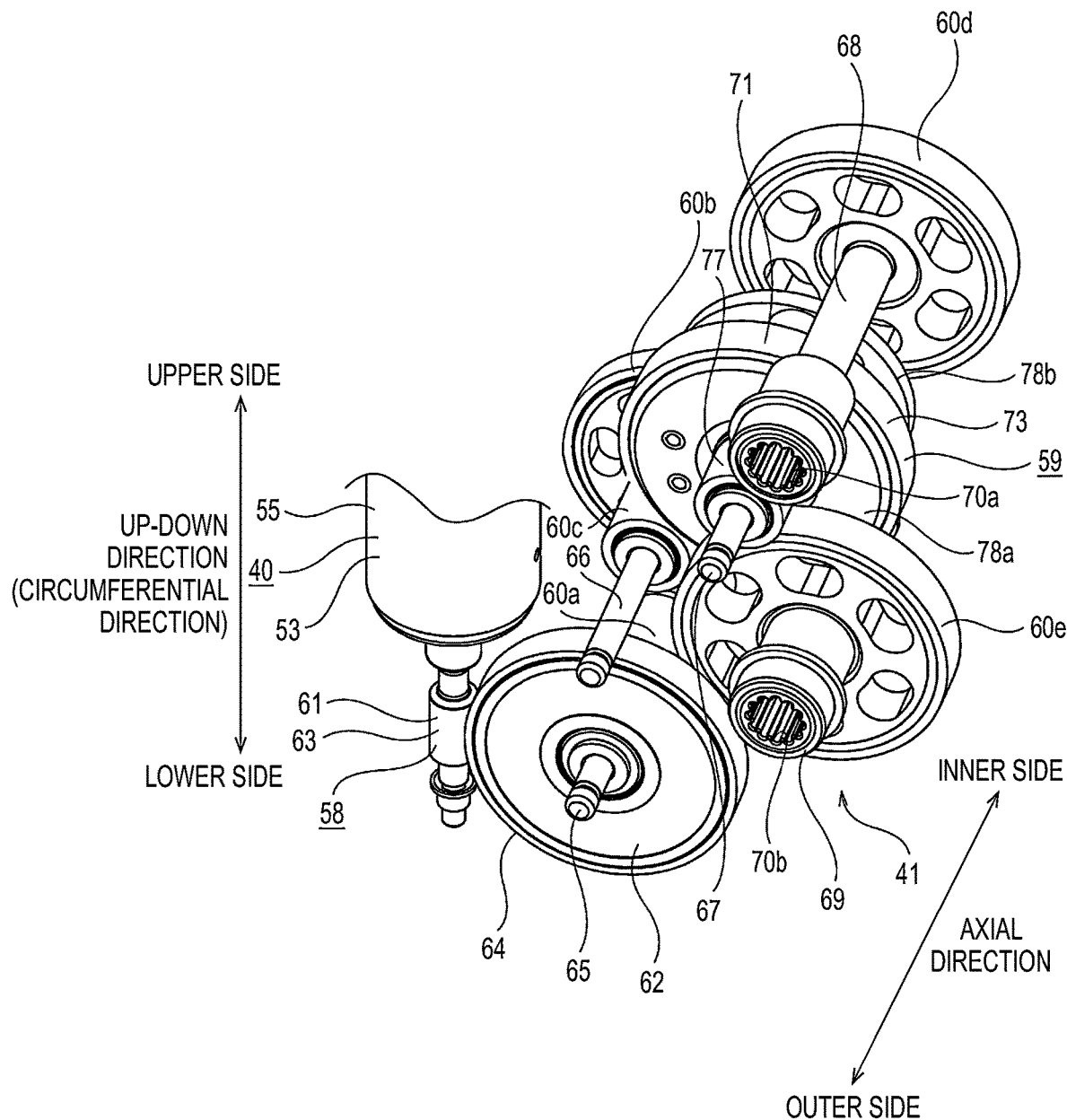
FIG. 12 is a perspective view of the motor gear unit according to the first embodiment, with a housing and a non-excited operation type brake omitted.

As shown in FIG. 11, the non-excited operation type brake 42 is accommodated in the brake accommodating portion 50 constituting the housing 39, and is connected to the second connection portion 57 of the motor shaft 54 constituting the electric motor 40. Specifically, the non-excited operation type brake 42 is connected to the second connection portion 57 via a connection shaft 80. The connection shaft 80 is connected to the second connection portion 57 in a way of being not relatively rotatable. The non-excited operation type brake 42 is a friction brake that has a function of allowing the rotation of the motor shaft 54 when energized, that is, when an engine of an automobile is running, and stopping the rotation of the motor shaft 54 when de-energized, that is, when the engine of the automobile is stopped. Note that in the following description of the non-excited operation type brake 42, an axial direction, a radial direction, and a circumferential direction mean the axial direction, the radial direction, and the circumferential direction of the motor shaft 54, unless otherwise specified.

The non-excited operation type brake 42 includes a casing 81, a fixed plate 82, an electromagnetic coil 83, an armature (pressing plate) 84, a plurality of (three in the illustrated example) rotation discs 85, a plurality of (two in the illustrated example) stationary discs 86, and a pressing spring 87.

(Casing)

The casing 81 includes a casing body 89 and an auxiliary yoke 90 separated from the casing body 89. Note that in the present embodiment, the casing 81 is disposed on the other side in the axial direction (an upper side in FIG. 19) with respect to the armature 84. Therefore, an end portion of the casing 81 located on a side opposite to the armature 84 in the axial direction refers to an end portion on the other side in the axial direction (an end portion on the upper side in FIG. 19).

The casing body 89 is made by pressing (deep drawing) a magnetic metal plate, and includes a coil accommodating portion 91 and a mounting flange 92.

The coil accommodating portion 91 has a substantially U-shaped cross-sectional shape that covers the electromagnetic coil 83 from three sides, and is formed in an annular shape as a whole. The coil accommodating portion 91 functions as a yoke. That is, the coil accommodating portion 91 forms a magnetic circuit when the electromagnetic coil 83 is energized, and magnetic flux passes through the inside of the magnetic circuit.

The coil accommodating portion 91 includes an inner peripheral side wall portion 93 having a cylindrical shape disposed on the inner side in the radial direction of the electromagnetic coil 83, an outer peripheral side wall portion 94 having a cylindrical shape disposed on the outer side in the radial direction of the electromagnetic coil 83, and a bottom wall portion 95 having a disc shape connecting an end portion of the inner peripheral side wall portion 93 on the other side in the axial direction and an end portion of the outer peripheral side wall portion 94 on the other side in the axial direction, in the radial direction. The inner peripheral side wall portion 93 and the outer peripheral side wall portion 94 are disposed coaxially with each other. The coil accommodating portion 91 is open on one side in the axial direction.

Since the casing body 89 of the present embodiment is made by pressing a magnetic metal plate having a constant thickness, a thickness $t_i$ of the inner peripheral side wall portion 93, a thickness $t_o$ of the outer peripheral side wall portion 94, and a thickness $t_b$ of the bottom wall portion 95 are the same with each other ($t_i = t_o = t_b$). Note that the case where the thicknesses are the same includes a case where the thicknesses are almost the same.

The coil accommodating portion 91 includes cut-and-raised pieces 96 at a plurality of locations (two locations in the illustrated example) in the circumferential direction of the bottom wall portion 95. In the present embodiment, the bottom wall portion 95 includes two cut-and-raised pieces 96. The two cut-and-raised pieces 96 are arranged on opposite sides of the bottom wall portion 95 in a diametrical direction. Each of the cut-and-raised pieces 96 is formed by pressing the bottom wall portion 95 and has a substantially L shape. The cut-and-raised piece 96 includes a standing portion 96a standing in the axial direction and a claw portion 96b bent from a tip portion of the standing portion 96a toward the inner side in the radial direction at a substantially right angle. The claw portion 96b is formed at the tip portion of the standing portion 96a after the auxiliary yoke 90 is internally fitted to the inner side in the radial direction of the coil accommodating portion 91. Note that during implementation of the present invention, the number of cut-and-raised pieces can be changed as appropriate.

The mounting flange 92 is provided at an end portion on one side in the axial direction of the outer peripheral side wall portion 94 that constitutes the coil accommodating portion 91 and extends toward the outer side in the radial direction. The mounting flange portion 92 is disposed substantially perpendicular to the outer peripheral side wall portion 94. The mounting flange 92 has an annular shape, and is provided with insertion holes 92a at a plurality of locations (three locations in the illustrated example) in the circumferential direction, through which rivets 100, which will be described later, can be inserted.

The auxiliary yoke 90 has a substantially cylindrical shape, is fixed by internally fitting to the coil accommodating portion 91 that constitutes the casing body 89, and functions as a yoke together with the coil accommodating portion 91.

The auxiliary yoke 90 is made by pressing a magnetic metal plate of the same type as the magnetic metal plate that constitutes the casing body 89, and includes a cylindrical portion 97, a plurality of (two in the illustrated example) outward engaging pieces 98, and a plurality of (four in the illustrated example) inward engaging pieces 99. Noted that during implementation of the present invention, the auxiliary yoke can also be made of a different kind of magnetic metal plate from that of the casing body.

The cylindrical portion 97 has a cylindrical shape and is internally fitted to the coil accommodating portion 91. In the present embodiment, the cylindrical portion 97 is internally fitted to the coil accommodating portion 91 by interference fit. Therefore, the cylindrical portion 97 has an outer diameter slightly larger than an inner diameter of the inner peripheral side wall portion 93 constituting the coil accommodating portion 91. An outer peripheral surface of the cylindrical portion 97 is in close contact with an inner peripheral surface of the inner peripheral side wall portion 93 over the entire circumference.

Figure 21:
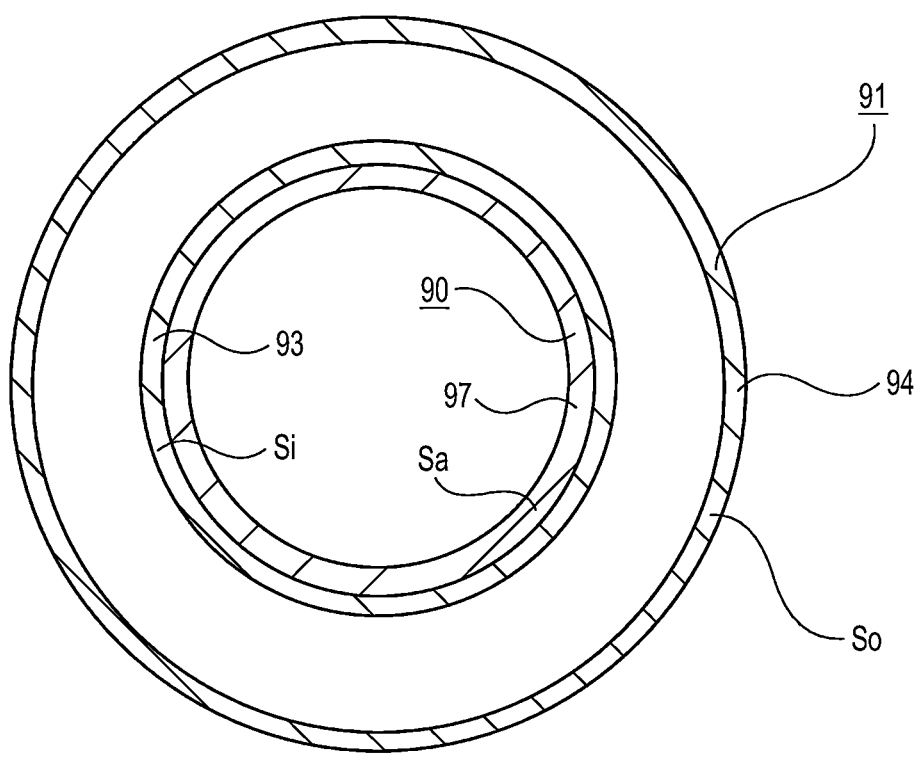
FIG. 21 is a schematic diagram corresponding to a cross section taken along a line D-D in FIG. 19, regarding a casing that constitutes the non-excited operation type brake according to the first embodiment.

A dimension in the axial direction of the cylindrical portion 97 is substantially the same as a dimension in the axial direction of the inner peripheral side wall portion 93. In the present embodiment, a thickness ta of the cylindrical portion 97 is set as follows. That is, as shown in FIG. 21, when the coil accommodating portion 91 and the auxiliary yoke 90 are cut by a virtual plane orthogonal to a central axis of the motor shaft 54, the thickness $t_a$ of the cylindrical portion 97 is defined geometrically such that the sum of a cross-sectional area $S_a$ of the cylindrical portion 97 and a cross-sectional area $S_i$ of the inner peripheral side wall portion 93 ($S_a + S_i$) is equal to or larger than a cross-sectional area $S_o$ of the outer peripheral side wall portion 94 ($S_a + S_i \geq S_o$). However, during implementation of the present invention, the thickness of the cylindrical portion can also be set such that the sum of the cross-sectional area of the cylindrical portion and the cross-sectional area of the inner peripheral side wall portion is smaller than or larger than the cross-sectional area of the outer peripheral side wall portion. For example, the thickness of the cylindrical portion is preferably set such that the sum of the cross-sectional area of the cylindrical portion and the cross-sectional area of the inner peripheral side wall portion ($S_a + S_i$) is 80% to 200% of the cross-sectional area ($S_o$) of the outer peripheral side wall portion.

The outward engaging piece 98 is provided at an end portion on the other side in the axial direction of the cylindrical portion 97 and extends toward the outer side in the radial direction. The outward engaging piece 98 has a substantially rectangular flat plate shape and is disposed substantially perpendicular to the cylindrical portion 97. In the present embodiment, the auxiliary yoke 90 includes two outward engaging pieces 98. The two outward engaging pieces 98 are arranged on opposite sides in the diametrical direction of the cylindrical portion 97. Note that during implementation of the present invention, the number of outward engaging pieces may be the same as that of the cut-and-raised pieces of the casing body, and can be changed as appropriate.

The outward engaging pieces 98 engage with the cut-and-raised pieces 96 provided on the bottom wall portion 95 constituting the casing body 89 in the axial direction. Specifically, the outward engaging pieces 98 are mechanically engaged with the claw portion 96b formed at the tip portion of the standing portion 96a with the auxiliary yoke 90 internally fitted to the coil accommodating portion 91 and phases of the outward engaging pieces 98 and the standing portion 96a matching with each other. The engagement between the outward engaging pieces 98 and the claw portions 96b of the cut-and-raised pieces 96 suppresses the auxiliary yoke 90 from coming off from the casing body 89 toward the other side in the axial direction.

Each of the outward engaging pieces 98 is formed with an engaging recess 98a on a side surface on the other side in the axial direction that engages with the claw portion 96b. With the outward engaging piece 98 engaged with the claw portion 96b, a side surface in the circumferential direction of the engaging recess 98a faces the claw portion 96b. In this way, the auxiliary yoke 90 can be suppressed from rotating relative to the casing body 89. By forming the engaging recess 98a on the outward engaging piece 98, a dimension in the axial direction of the standing portion 96a constituting the cut-and-raised piece 96 can be shortened, and a dimension in the radial direction of the claw portion 96b can be increased, so that a large engagement margin in the radial direction can be ensured between the outward engaging piece 98 and the claw portion 96b.

Each of the inward engaging pieces 99 has a substantially L shape and is provided at an end portion on the other side in the axial direction of the cylindrical portion 97. The inward engaging piece 99 includes an axial plate portion 99a extending in the axial direction from the end portion on the other side in the axial direction of the cylindrical portion 97, and a radial plate portion 99b extending from a tip portion of the axial plate portion 99a toward the inner side in the radial direction. In the present embodiment, the auxiliary yoke 90 includes four inward engaging pieces 99. The four inward engaging pieces 99 are arranged at a regular interval in the circumferential direction. Each of the outward engaging pieces 98 is disposed between a pair of the inward engaging pieces 99 adjacent to each other in the circumferential direction. Noted that during implementation of the present invention, the inward engaging piece can also be constituted only by a radial extending portion. The number of inward engaging pieces is sufficient in two or more, and can be changed as appropriate.

(Fixed Plate)

The fixed plate 82 is made of a metal plate and has a hollow triangular shape as a whole. The fixed plate 82 is fixed to the casing body 89 with a space therebetween in the axial direction. Specifically, the fixed plate 82 is fixed to the mounting flange 92 constituting the casing body 89 by using a plurality of (three in the illustrated example) rivets 100. For this reason, the fixed plate 82 is provided with insertion holes 82a through which the rivets 100 can be inserted, at a plurality of locations in the circumferential direction of a portion on the outer side in the radial direction. A spacer 101 having a cylindrical shape is externally fitted around the rivets 100 while the casing body 89 and the fixed plate 82 are fixed to each other by the rivets 100. In other words, the spacer 101 is sandwiched between the casing body 89 and the fixed plate 82. Therefore, the fixed plate 82 is spaced apart from the casing body 89 on one side in the axial direction by a length of the spacer 101.

The fixed plate 82 is provided with mounting holes 82b at a plurality of locations in the circumferential direction of a portion on the outer side in the radial direction. The fixed plate 82 is fixed to the brake accommodating portion 50 constituting the housing 39 by a plurality of bolts (not shown) inserted through the mounting holes 82b.

(Electromagnetic Coil)

The electromagnetic coil 83 has an annular shape and is accommodated inside the coil accommodating portion 91 that constitutes the casing 81. In the present embodiment, the electromagnetic coil 83 includes an electric wire 102 and an annular bobbin 103 around which the electric wire 102 is wound. When energized, the electromagnetic coil 83 generates a magnetic field in a direction indicated by an arrow X in FIG. 19 (or a direction opposite to the arrow X) around the electromagnetic coil 83.

(Armature)

The armature 84 is made of a magnetic metal plate and has an annular plate shape as a whole. The armature 84 is disposed between the fixed plate 82 and the electromagnetic coil 83 and covers an opening on one side in the axial direction of the coil accommodating portion 91 accommodating the electromagnetic coil 83. The armature 84 forms a magnetic circuit together with the coil accommodating portion 91 and the auxiliary yoke 90 when the electromagnetic coil 83 is energized.

The armature 84 is supported by the casing 81 in a way of being relatively displaceable in the axial direction but not relatively displaceable in the circumferential direction. For this reason, the rivets 100 are inserted into through holes 84a provided at an end portion on the outer side in the radial direction of the armature 84.

(Rotation Disc)

The rotation disc 85 is disposed coaxially with the motor shaft 54 between the fixed plate 82 and the armature 84. The rotation disc 85 has a disc shape and is provided with a spline hole 85a at a central portion in the radial direction. In the present embodiment, a plurality of rotation discs 85 (three in the illustrated example) are provided.

By spline-engaging the spline hole 85a with a male spline portion 80a provided on an outer peripheral surface of the connection shaft 80, the rotation disc 85 can be engaged with the connection shaft 80 in a way of being relatively displaceable in the axial direction but not relatively displaceable in the circumferential direction. Therefore, the rotation disc 85 can rotate in synchronization with the motor shaft 54.

(Stationary Disc)

The stationary discs 86 are disposed alternately with the rotation discs 85 in the axial direction. In the present embodiment, a plurality of stationary discs 86 (two in the illustrated example) are provided, each of which is disposed between the rotation discs 85 adjacent to each other in the axial direction.

The stationary disc 86 has an annular shape, and is provided with a through hole 86a at a central portion in the radial direction, through which the connection shaft 80 can be inserted, and bifurcated engagement protrusions 86b at a plurality of locations (three locations in the illustrated example) in the circumferential direction of an outer peripheral edge portion.

By engaging the engagement protrusions 86b with the spacer 101, the stationary discs 86 are supported by the casing 81 in a way of being relatively displaceable in the axial direction but not relatively displaceable in the circumferential direction. Therefore, the stationary discs 86 do not rotate even when the motor shaft 54 rotates.

(Pressing Spring)

The pressing spring 87 presses the armature 84 toward one side in the axial direction (a lower side in FIG. 19), which is a direction away from the electromagnetic coil 83 in the axial direction.

The pressing spring 87 is a coil spring and is disposed on an inner side in the radial direction of the auxiliary yoke 90. The pressing spring 87 is disposed while being compressed in the axial direction between the armature 84 and the inward engaging pieces 99 provided on the auxiliary yoke 90. In other words, the pressing spring 87 is elastically stretched between the armature 84 and the inward engaging pieces 99. In this way, the pressing spring 87 biases the armature 84 toward a direction away from the electromagnetic coil 83 in the axial direction.

[Description of Operation of Non-Excited Operation Type Brake]

The non-excited operation type brake 42 of the present embodiment forms a magnetic circuit in the casing 81 and the armature 84 disposed around the electromagnetic coil 83 when the electromagnetic coil 83 is energized. Specifically, when the electromagnetic coil 83 is energized, a magnetic circuit is formed in the coil accommodating portion 91, the auxiliary yoke 90, and the armature 84. As a result, the armature 84 is moved (magnetically attracted) toward the electromagnetic coil 83 against an elastic force of the pressing spring 87. In other words, the armature 84 elastically compresses and deforms the pressing spring 87. As a result, the rotation disc 85 is not pressed against the fixed plate 82 and/or the stationary disc 86 by the armature 84, so that the motor shaft 54 is allowed to rotate.

On the other hand, when the electromagnetic coil 83 is de-energized, unlike when the electromagnetic coil is energized, no magnetic circuit is formed in the coil accommodating portion 91, the auxiliary yoke 90, and the armature 84. Therefore, the rotation disc 85 is pressed against the fixed plate 82 and/or the stationary disc 86 by the armature 84 and frictionally engages with the fixed plate 82 and/or the stationary disc 86. As a result, the rotation of the motor shaft 54 is stopped.

[Description of Operation of Disc Brake Device]

When the disc brake device 1 of the present embodiment operates the service brake, brake oil is fed to the first cylinder 20*a* and the second cylinder 20*b* provided in the caliper 3 through oil passages (not shown). As a result, the first piston 5*a* and the second piston 5*b* are pushed out from the first cylinder 20*a* and the second cylinder 20*b*, and the inner pad 4*b* is pressed against a surface of the rotor 8 on the inner side in the axial direction. The caliper 3 is displaced to an inner side in the axial direction with respect to the support 2 by a reaction force accompanying the pressing. Then, the pressing portion 15 of the caliper 3 presses the outer pad 4*a* against a surface of the rotor 8 on the outer side in the axial direction. In this way, a braking force is obtained by friction applied to a contact surface between the pair of pads 4*a* and 4*b* and the rotor 8. Therefore, the disc brake device 1 obtains the braking force of the service brake by pushing out the first piston 5*a* and the second piston 5*b* by introducing the brake oil.

When the parking brake is operated by the disc brake device 1, the electric motor 40 constituting the motor gear unit 7 is energized, and the spindle 29*a* constituting the first rotary-to-linear motion conversion mechanism 6*a* and the spindle 29*b* constituting the second rotary-to-linear motion conversion mechanism 6*b* are rotationally driven in the forward rotation direction via the reduction mechanism 41. Then, the nuts 30*a* and 30*b* are moved to the outer side in the axial direction. By pushing out the first piston 5*a* and the second piston 5*b* toward the rotor 8, the inner pad 4*b* is pressed against the surface of the rotor 8 on the inner side in the axial direction. The caliper 3 is displaced to an inner side in the axial direction with respect to the support 2 by a reaction force accompanying the pressing. Then, the pressing portion 15 of the caliper 3 presses the outer pad 4*a* against a surface of the rotor 8 on the outer side in the axial direction. In this way, a braking force is obtained by friction applied to a contact surface between the pair of pads 4*a* and 4*b* and the rotor 8. Therefore, the disc brake device 1 obtains the braking force of the parking brake by pushing out the first piston 5*a* and the second piston 5*b* by using the motor gear unit 7.

When the engine of the automobile is stopped and the electric motor 40 is de-energized, the electromagnetic coil 83 constituting the non-excited operation type brake 42 is also de-energized. Therefore, the rotation of the motor shaft 54 can be stopped by the non-excited operation type brake 42. That is, retraction of the first piston 5*a* and the second piston 5*b* is suppressed, and the inner pad 4*b* and the outer pad 4*a* can be kept pressed against the side surfaces in the axial direction of the rotor 8. Therefore, the disc brake device 1 of the present embodiment can maintain the braking force of the parking brake even when the electric motor 40 is de-energized.

According to the non-excited operation type brake 42 incorporated in the disc brake device 1 according to the present embodiment as described above, it is possible to suppress occurrence of magnetic flux leakage and sufficiently ensure a magnetic attraction force for moving the armature 84 toward the electromagnetic coil 83.

In other words, in the non-excited operation type brake 42 of the present embodiment, the casing 81 is constituted by the casing body 89 including the coil accommodating portion 91 functioning as a yoke, and the auxiliary yoke 90 internally fitted in the coil accommodating portion 91 and separated from the casing body 89. As a result, by manufacturing the casing body 89 by pressing a magnetic metal plate, even when the thickness $t_i$ of the inner peripheral side wall portion 93 and the thickness $t_o$ of the outer peripheral side wall portion 94 are the same, the magnetic flux that cannot pass through the inner peripheral side wall portion 93 (leaks from the inner peripheral side wall portion 93) can pass through the cylindrical portion 97 of the auxiliary yoke 90. In other words, by internally fitting the auxiliary yoke 90 inside the inner peripheral side wall portion 93, the same effect as when the thickness $t_i$ of the inner peripheral side wall portion 93 is substantially increased by the thickness $t_a$ of the cylindrical portion 97 can be obtained. Therefore, according to the non-excited operation type brake 42 of the present embodiment, the magnetic flux leakage from the casing 81 can be suppressed, so that a sufficient magnetic attraction force for moving the armature 84 toward the electromagnetic coil 83 can be ensured. Since the casing body 89 and the auxiliary yoke 90 can be manufactured by press working, a cost of the non-excited operation type brake 42 can be reduced.

In the present embodiment, the thickness $t_a$ of the cylindrical portion 97 is set such that the sum of the cross-sectional area $S_a$ of the cylindrical portion 97 and the cross-sectional area $S_i$ of the inner peripheral side wall portion 93 ($S_a+S_i$) is equal to or larger than the cross-sectional area $S_o$ of the outer peripheral side wall portion 94. Therefore, the magnetic flux that can pass through the inside of the outer peripheral side wall portion 94 and the magnetic flux that can pass through the insides of the cylindrical portion 97 and the inner peripheral side wall portion 93 can be made substantially the same, so that the magnetic flux leakage from the casing 81 can be effectively suppressed.

In the present embodiment, not only the auxiliary yoke 90 is internally fitted to the coil accommodating portion 91 constituting the casing body 89, but also the outward engaging pieces 98 provided on the auxiliary yoke 90 are mechanically engaged with the cut-and-raised pieces 96 (claw portions 96b) provided on the bottom wall portion 95 constituting the coil accommodating portion 91. Therefore, it is possible to effectively suppress the auxiliary yoke 90 from coming off from the casing body 89 to the other side in the axial direction regardless of the elastic force applied from the pressing spring 87 to the auxiliary yoke 90 toward the other side in the axial direction.

In addition, since the side surface in the circumferential direction of the engaging recess 98a provided on the side surface on the other side in the axial direction of the outward engaging piece 98 is opposed to the claw portion 96b of the cut-and-raised piece 96, the rotation of the auxiliary yoke 90 relative to the casing body 89 can also be suppressed.

In the present embodiment, since the pressing spring 87 is disposed on the inner side in the radial direction of the auxiliary yoke 90, a size of the non-excited operation type brake 42 in the axial direction can be reduced. Since the auxiliary yoke 90 is provided with the inward engaging pieces 99 that support the elastic force of the pressing spring 87, the casing 81 (auxiliary yoke 90) can have a function of holding the pressing spring 87. In this way, there is no need for a dedicated component for holding the pressing spring, and thus the number of components can be reduced.

In the present embodiment, instead of providing a worm reduction mechanism having a self-locking function, the non-excited operation type brake 42 is used. As a result, frictional resistance (energy loss) can be reduced, and input and output characteristics can be improved, as compared with the case of using a worm reduction mechanism having a self-locking function.

Although the embodiment of the present invention is described above, the present invention is not limited to this and can be modified as appropriate without departing from the technical concept of the invention.

The non-excited operation type brake of the present invention can be applied not only to a floating type disc brake device but also to an opposed piston type disc brake device. The non-excited operation type brake of the present invention can be applied not only to disc brake devices but also to drum brake devices. The non-excited operation type brake of the present invention can be applied not only to brake devices for automobiles, but also to brake devices for various machine tools, brake devices for various industrial machines, and the like.

The present invention is not limited to the structures described in the embodiments. For example, when implementing the present invention, it is also possible to omit the stationary disc from the non-excited operation type brake and to arrange only the rotation disc between the armature and the fixed plate. The shape of the retaining pieces provided in the coil accommodating portion constituting the casing body and the shape of the outward engaging portions provided in the auxiliary yoke can be changed as appropriate. The shape of the inward engaging pieces provided on the auxiliary yoke can also be changed as appropriate.

What is claimed is:

1. A non-excited operation type brake for a brake device that is configured to allow rotation of a motor shaft when energized and that is configured to stop the rotation of the motor shaft when de-energized, comprising:
    a casing that is configured to function as a yoke and that includes a coil accommodating portion having a substantially U-shaped cross section and formed in an annular shape as a whole;
    a fixed plate that is fixed to the casing while being separated from the casing in an axial direction of the motor shaft;
    an electromagnetic coil that is accommodated in the coil accommodating portion;
    an armature that is disposed between the fixed plate and the electromagnetic coil;
    a rotation disc that is disposed coaxially with the motor shaft between the fixed plate and the armature; and
    a pressing spring that is configured to bias the armature in a direction away from the electromagnetic coil in the axial direction of the motor shaft, wherein
    the rotation disc is engaged with the motor shaft or a shaft that is configured to rotate in synchronism with the motor shaft in a way of being displaceable relative to the axial direction of the motor shaft and not displaceable relative to a circumferential direction of the motor shaft,
    the casing further includes an auxiliary yoke that has a substantially cylindrical shape and that is fitted inside the coil accommodating portion, the auxiliary yoke being separated from the coil accommodating portion,
    the coil accommodating portion includes an inner peripheral side wall portion disposed on an inner side in a radial direction of the electromagnetic coil, an outer peripheral side wall portion disposed on an outer side in the radial direction of the electromagnetic coil, and a bottom wall portion connecting an end portion of the inner peripheral side wall portion and an end portion of the outer peripheral side wall portion in a radial direction of the motor shaft,
    the inner peripheral side wall portion, the outer peripheral side wall portion, and the bottom wall portion have the same thickness,
    the casing includes a casing body including the coil accommodating portion and the auxiliary yoke,
    the coil accommodating portion includes a substantially L-shaped cut-and-raised piece on the bottom wall portion,
    the auxiliary yoke includes an outward engaging piece extending toward the outer side in the radial direction at an end portion on a side opposite to the armature in the axial direction of the motor shaft, and
    the auxiliary yoke is configured to be suppressed from coming off from the casing body by engagement between the cut-and-raised piece and the outward engaging piece.

2. The non-excited operation type brake for the brake device according to claim 1, wherein
    the pressing spring is a coil spring and is disposed on an inner side in a radial direction of the auxiliary yoke.

3. The non-excited operation type brake for the brake device according to claim 2, wherein
    the auxiliary yoke includes an inward engaging piece extending toward the inner side in the radial direction at an end portion on a side opposite to the armature in the axial direction of the motor shaft, and the pressing spring is disposed between the armature and the inward engaging piece in the axial direction of the motor shaft.

4. The non-excited operation type brake for the brake device according to claim 1, further comprising:
a stationary disc supported by the casing in a way of being displaceable relative to the axial direction of the motor shaft and not displaceable relative to the circumferential direction of the motor shaft, wherein
a plurality of the rotation discs are provided, and
the stationary disc is disposed between the rotation discs adjacent to each other in the axial direction of the motor shaft.

5. A disc brake device, comprising:
a caliper including a cylinder on an inner side of a rotor in an axial direction of the rotor;
a piston fitted in the cylinder;
a rotary-to-linear motion conversion mechanism that is disposed in the cylinder and that is configured to convert rotary motion into linear motion so as to push the piston toward the rotor; and
a motor gear unit that is supported by and fixed to the caliper and that is configured to drive the rotary-to-linear motion conversion mechanism, wherein
the motor gear unit includes an electric motor including a motor shaft, and a non-excited operation type brake that is configured to allow rotation of the motor shaft when energized and that is configured to stop the rotation of the motor shaft when de-energized, and
the non-excited operation type brake is the non-excited operation type brake for the brake device according to claim 1.

6. A disc brake device, comprising:
a caliper including a cylinder on an inner side of a rotor in an axial direction of the rotor;
a piston fitted in the cylinder;
a rotary-to-linear motion conversion mechanism that is disposed in the cylinder and that is configured to convert rotary motion into linear motion so as to push the piston toward the rotor; and
a motor gear unit that is supported by and fixed to the caliper and that is configured to drive the rotary-to-linear motion conversion mechanism, wherein
the motor gear unit includes an electric motor including a motor shaft, and a non-excited operation type brake that is configured to allow rotation of the motor shaft when energized and that is configured to stop the rotation of the motor shaft when de-energized, and
the non-excited operation type brake is the non-excited operation type brake for the brake device according to claim 2.

7. A disc brake device, comprising:
a caliper including a cylinder on an inner side of a rotor in an axial direction of the rotor;
a piston fitted in the cylinder;
a rotary-to-linear motion conversion mechanism that is disposed in the cylinder and that is configured to convert rotary motion into linear motion so as to push the piston toward the rotor; and
a motor gear unit that is supported by and fixed to the caliper and that is configured to drive the rotary-to-linear motion conversion mechanism, wherein
the motor gear unit includes an electric motor including a motor shaft, and a non-excited operation type brake that is configured to allow rotation of the motor shaft when energized and that is configured to stop the rotation of the motor shaft when de-energized, and
the non-excited operation type brake is the non-excited operation type brake for the brake device according to claim 3.

8. A disc brake device, comprising:
a caliper including a cylinder on an inner side of a rotor in an axial direction of the rotor;
a piston fitted in the cylinder;
a rotary-to-linear motion conversion mechanism that is disposed in the cylinder and that is configured to convert rotary motion into linear motion so as to push the piston toward the rotor; and
a motor gear unit that is supported by and fixed to the caliper and that is configured to drive the rotary-to-linear motion conversion mechanism, wherein
the motor gear unit includes an electric motor including a motor shaft, and a non-excited operation type brake that is configured to allow rotation of the motor shaft when energized and that is configured to stop the rotation of the motor shaft when de-energized, and
the non-excited operation type brake is the non-excited operation type brake for the brake device according to claim 4.

* * * * *